United States Patent
Kenion et al.

(10) Patent No.: US 12,371,099 B2
(45) Date of Patent: *Jul. 29, 2025

(54) VEHICLE CORNER MODULE AND METHODS FOR INSTALLATION THEREOF

(71) Applicant: REE AUTOMOTIVE LTD., Kibbutz Glil-Yam (IL)

(72) Inventors: Troy Kenion, Coventry (GB); Gail Marie Prince, Nuneaton (GB)

(73) Assignee: REE AUTOMOTIVE LTD, Kibbutz Glil Yam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/575,335

(22) PCT Filed: Jul. 19, 2022

(86) PCT No.: PCT/IB2022/056616
§ 371 (c)(1),
(2) Date: Dec. 29, 2023

(87) PCT Pub. No.: WO2023/007308
PCT Pub. Date: Feb. 2, 2023

(65) Prior Publication Data
US 2024/0317308 A1    Sep. 26, 2024

Related U.S. Application Data

(63) Continuation of application No. 17/715,117, filed on Apr. 7, 2022, now Pat. No. 11,479,295.

(30) Foreign Application Priority Data

Jul. 28, 2021 (GB) .................................. 2110885.7

(51) Int. Cl.
*B62D 7/18* (2006.01)
*B60B 27/00* (2006.01)

(52) U.S. Cl.
CPC ............ *B62D 7/18* (2013.01); *B60B 27/0047* (2013.01)

(58) Field of Classification Search
CPC B60K 1/04; B60K 2001/0438; B62D 21/157; B62D 25/2036; B62D 7/18; B60B 27/0047
(Continued)

(56) References Cited

U.S. PATENT DOCUMENTS 2,678,830 A    5/1954   Cigan
4,951,964 A    8/1990   Sakamoto
(Continued)

FOREIGN PATENT DOCUMENTS

DE    102019125792 A1    3/2021
EP    2818349 A1    12/2014
(Continued)

OTHER PUBLICATIONS

International Search Report for PCT/IB2022/056616 document completed Nov. 24, 2022.
(Continued)

*Primary Examiner* — James A Shriver, II
*Assistant Examiner* — Hilary L Johns
(74) *Attorney, Agent, or Firm* — Marc Van Dyke; Momentum IP

(57) ABSTRACT

Some embodiments relate to a vehicle corner module (VCM) connectable to a VCM-connection interface of a reference-frame of a vehicle platform (e.g. for regulating motion of a vehicle). Some embodiments relate to a multi-interface connection-element for connection of multiple electronic or flow vehicle subsystems of a vehicle to a Vehicle Corner Module (VCM). Related methods are disclosed herein.

10 Claims, 14 Drawing Sheets

(58) Field of Classification Search
USPC .............................. 180/68.5; 280/70, 93.512
See application file for complete search history.

(56) References Cited

U.S. PATENT DOCUMENTS

| | | | |
|---|---|---|---|
| 6,267,387 B1 | 7/2001 | Weiss | |
| 6,874,816 B2 | 4/2005 | Herrmann | |
| 10,668,926 B2 | 6/2020 | Birnschein | |
| 10,919,575 B1* | 2/2021 | Sardes | B62D 21/10 |
| 11,180,207 B2 | 11/2021 | Sardes | |
| D944,684 S | 3/2022 | Aknin | |
| 11,260,714 B2 | 3/2022 | Thoreson | |
| 11,267,522 B2* | 3/2022 | Sardes | B60W 10/20 |
| 11,285,994 B2 | 3/2022 | Gordon | |
| 11,299,200 B1 | 4/2022 | Starik | |
| 11,332,005 B2 | 5/2022 | Aknin | |
| 11,448,308 B2 | 9/2022 | Starik | |
| 11,465,636 B2 | 10/2022 | Sutton | |
| 11,465,699 B1 | 10/2022 | Sardes | |
| 11,479,295 B1 | 10/2022 | Kenion | |
| 11,479,313 B2 | 10/2022 | Sardes | |
| 11,524,667 B2 | 12/2022 | Orlov | |
| 11,654,987 B2 | 5/2023 | Sardes | |
| 11,667,192 B2 | 6/2023 | Aknin | |
| 11,667,328 B2 | 6/2023 | Kenion | |
| 11,780,285 B2 | 10/2023 | Jefferies | |
| 11,840,247 B2 | 12/2023 | Barel | |
| 11,845,455 B2 | 12/2023 | Sutton | |
| 11,891,138 B2 | 2/2024 | Sardes | |
| 11,919,357 B2 | 3/2024 | Jefferies | |
| 12,168,492 B2 | 12/2024 | Sardes | |
| 12,179,862 B2 | 12/2024 | Sardes | |
| 2005/0073123 A1 | 4/2005 | Kapaan | |
| 2012/0267185 A1 | 10/2012 | Hirai | |
| 2013/0333966 A1 | 12/2013 | Bryant | |
| 2015/0083508 A1* | 3/2015 | Bluethmann | B62D 5/0418 |
| | | | 180/204 |
| 2018/0345777 A1* | 12/2018 | Birnschein | B60W 10/08 |
| 2018/0345971 A1* | 12/2018 | Birnschein | B60H 1/00392 |
| 2019/0144034 A1* | 5/2019 | Bertassi | B62D 7/18 |
| | | | 280/93.512 |
| 2019/0291797 A1 | 9/2019 | Richards | |
| 2021/0197897 A1* | 7/2021 | Sardes | B62D 63/025 |
| 2021/0284262 A1* | 9/2021 | Sardes | G06Q 10/00 |
| 2022/0161878 A1* | 5/2022 | Sardes | B60K 23/00 |

FOREIGN PATENT DOCUMENTS

| | | |
|---|---|---|
| GB | 2565848 A | 2/2019 |
| SE | 1850807 A1 | 12/2019 |
| WO | 2020/201984 A1 | 10/2020 |
| WO | 2020/239099 A1 | 12/2020 |
| WO | 2021/137194 A1 | 7/2021 |
| WO | 2021/137197 A1 | 7/2021 |

OTHER PUBLICATIONS

Written Opinion for PCT/IB2022/056616 document completed Nov. 24, 2022.

* cited by examiner

VEHICLE CORNER MODULE AND METHODS FOR INSTALLATION THEREOF

FIELD OF THE INVENTION

The present invention relates to Vehicle Corner Modules (VCMs) for regulating the motion of a vehicle, and particularly to Vehicle Corner Modules (VCMs) having a sub-frame holding systems for regulating the motion of a vehicle and installing the VCMs on a reference frame, or platform, of the vehicle.

BACKGROUND OF THE INVENTION

With the future of automotive ownership becoming less privately-owned and more fleet-based and shared-mobility based, maintenance of such future vehicles is becoming a major factor in the profitability of vehicle fleets. Vehicle platforms designed for electric propulsion can include axle-less wheel assemblies, which have independent suspension, drivetrain, braking and steering subsystems between wheel assemblies assembled on a platform of the vehicle.

Connection or removal of the subsystems associated with the wheel assemblies to and of the vehicle platform can be a complex and specialized job.

There is therefore a need for systems and methods for simple and quick installation and removal of one or more wheel assemblies on and off a reference frame of a vehicle.

SUMMARY OF EMBODIMENTS OF THE INVENTION

Some embodiments of the invention relate to methods and systems for installing VCMs having an L-shaped sub-frame on a reference frame, or platform, of the vehicle.

There is thus provided, in accordance with an embodiment of the teachings herein, a vehicle corner module (VCM) connectable to a VCM-connection interface of a reference-frame of a vehicle platform, for regulating motion of a vehicle, the VCM including:
  a sub-frame including:
    a base;
    a wall disposed transversely to the base; and
    a vehicle-connection interface for reversible mechanical connection of the VCM to the VCM-connection interface of the reference frame;
  a wheel-hub assembly including a wheel-hub adapted for mounting of a wheel thereon; and
  at least one subsystem of the vehicle, including a subsystem unit mounted onto the base of the sub-frame, the at least one subsystem being selected from the group of subsystems consisting of a drive subsystem, a steering subsystem, and a braking subsystem.

In some embodiments, the wall of the sub-frame is disposed between the wheel-hub and the base of the sub-frame.

In some embodiments, when a wheel is connected to the wheel-hub, at least a portion of the base of the sub-frame is within a cylindrical footprint of the wheel.

In some embodiments, the at least one subsystem unit is adjacent a first side of the wall, and the wheel-hub assembly is adjacent a second, opposing, side of the wall, such that the wall is disposed between the at least one subsystem unit and the wheel-hub assembly.

In some embodiments, the VCM further includes a suspension subsystem mounted onto the wall of the sub-frame, between the sub-frame and the wheel-hub assembly.

In some embodiments, the subsystem unit of the at least one subsystem does not engage the wall of the sub-frame.

In some embodiments, the at least one subsystem includes the drive subsystem, which includes a drive subsystem unit having a drive motor mounted onto the base of the sub-frame, and a drive shaft mounted via the wall of the sub-frame, the wall being disposed between the drive motor and the drive shaft.

In some embodiments, the at least one subsystem includes the steering subsystem, which includes a steering subsystem unit having a steering actuator mounted onto the base of the sub-frame.

In some embodiments, the at least one subsystem includes the braking subsystem, which includes a braking subsystem unit having a brake pump mounted onto the base of the sub-frame.

In some embodiments, when a wheel is mounted on the wheel-hub assembly, the vehicle-connection interface is disposed within a cylindrical footprint of the wheel. In some embodiments, at least one of the at least one subsystem is accommodated between the wheel-hub assembly and the vehicle-connection interface.

In some embodiments, the vehicle-connection interface includes bores formed in the base of the sub-frame, the bores adapted to accommodate base-connecting fasteners for connecting the base of the sub-frame to a lower surface of the reference frame. In some embodiments, the vehicle-connection interface includes bores formed in the wall of the sub-frame, the bores adapted to accommodate wall-connecting fasteners for connecting the wall of the sub-frame to a side surface of the reference frame.

In some embodiments, when the sub-frame is connected to the reference-frame by engagement of the vehicle-connection interface with the VCM-connection interface, the vehicle-connection interface is disposed between the wheel and the reference-frame.

In some embodiments, the vehicle further includes at least one power supply, and wherein the VCM further includes at least one connector for connection to the at least one power supply, such that, when the VCM is connected to the vehicle, the at least one power supply powers the at least one subsystem.

In some embodiments, connection of the sub-frame to the reference-frame by engagement of the vehicle-connection interface with the VCM-connection interface is carried out by longitudinally aligning the sub-frame with the VCM-connection interface, with the sub-frame disposed below the reference-frame, and moving the VCM upward to facilitate the engagement of the vehicle-connection interface with the VCM-connection interface.

In some embodiments, the VCM further includes a VCM-portion of a multi-interface connection-element, mounted onto the base of the sub-frame and adapted for connection to a vehicle-platform-portion of the multi-interface connection-element, the vehicle-platform-portion being mounted onto the reference-frame of the vehicle platform and connected to multiple electronic or flow subsystems of the vehicle. The VCM-portion of the multi-interface connection-element may include multiple connection interfaces for connection of the VCM-portion to the vehicle-platform-portion, thereby to connect the VCM to each of the multiple electronic subsystems of the vehicle. Each of the multiple electronic or flow subsystems may be selected from the group consisting of a power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.

There is further provided, in accordance with an embodiment of the teachings herein, a vehicle including:
- a vehicle platform including a reference frame having an upper surface and a lower surface, the reference frame including at least one VCM-connection interface;
- at least one vehicle corner module (VCM) connected to a VCM-connection interface of the reference-frame, the at least one VCM adapted for regulating motion of the vehicle, the VCM including:
  - a sub-frame including:
    - a base;
    - a wall disposed transversely to the base; and
    - a vehicle-connection interface reversibly and mechanically engaging the VCM-connection interface of the reference frame;
  - a wheel-hub assembly including a wheel-hub adapted for mounting of a wheel thereon; and
  - at least one subsystem of the vehicle, including a subsystem unit mounted onto the base of the sub-frame, the at least one subsystem being selected from the group of subsystems consisting of a drive subsystem, a steering subsystem, and a braking subsystem.

In some embodiments, the at least one subsystem unit is adjacent a first side of the wall, and the wheel-hub assembly is adjacent a second, opposing side of the wall, such that the wall is disposed between the at least one subsystem unit and the wheel-hub assembly.

In some embodiments, the vehicle further includes a suspension subsystem mounted onto the wall of the sub-frame, between the sub-frame and the wheel-hub assembly.

In some embodiments, the subsystem unit of the at least one subsystem does not engage the wall of the sub-frame.

In some embodiments, the at least one subsystem includes the drive subsystem, which includes a drive subsystem unit having a drive motor mounted onto the base of the sub-frame and a drive shaft mounted via the wall of the sub-frame, the wall being disposed between the drive motor and the drive shaft.

In some embodiments, the at least one subsystem includes the steering subsystem, which includes a steering subsystem unit having a steering actuator mounted onto the base of the sub-frame.

In some embodiments, the at least one subsystem includes the braking subsystem, which includes a braking subsystem unit having a brake pump mounted onto the base of the sub-frame.

In some embodiments, the vehicle-connection interface of the sub-frame is reversibly and mechanically connected to the VCM-connection interface of the reference frame. In some embodiments, the vehicle-connection interface is disposed between the wheel and the reference-frame.

In some embodiments, the vehicle further includes at least one power supply, the VCM being connected to the at least one power supply such that the at least one power supply powers the at least one subsystem.

In some embodiments, the vehicle-connection interface includes a plurality of fasteners fastening the VCM to corresponding bores forming part of the VCM-connection interface of the reference-frame.

In some embodiments, the vehicle further includes multiple electronic or flow subsystems, each selected from the subsystem group consisting of a power supply, a control-circuit, a computerized controller, a network bus, a network interface, a coolant flow subsystem, an oil flow subsystem, and a brake fluid flow subsystem and a multi-interface connection-element including a VCM-portion mounted onto the base of the sub-frame, reversibly connected to a corresponding vehicle-platform-portion mounted onto the reference-frame and connected to the multiple electronic or flow subsystems, each of the VCM-portion and the vehicle-platform-portion including multiple connection interfaces for connection to the other of the VCM-portion and the vehicle-platform-portion. Connection of the VCM-portion to the vehicle-platform-portion of the multi-interface connection-element results in connection of the VCM to the multiple electronic or flow subsystems.

In some embodiments, for each electronic or flow subsystem of the multiple electronic or flow subsystems, one of the VCM-portion and vehicle-platform-portion of the multi-interface connection-element includes a port, and the other of the VCM-portion and vehicle-platform-portion includes a corresponding plug, which, when the first and second portions are connected, is received in the port to connect the VCM to the electronic or flow subsystem.

There is additionally provided, in accordance with an embodiment of the teachings herein, a vehicle corner module (VCM) connectable to a VCM-connection interface of a reference-frame of a vehicle platform, the reference-frame having mounted thereon a vehicle-platform-portion of a multi-interface connection-element, the vehicle-platform-portion including multiple connection interfaces, each connected to one of multiple electronic or flow subsystems of the vehicle, the VCM including:
- a sub-frame including:
  - a base;
  - a wall disposed transversely to the base; and
  - a vehicle-connection interface for reversible mechanical connection of the VCM to the VCM-connection interface of the reference frame;
- a wheel-hub assembly including a wheel-hub adapted for mounting of a wheel thereon;
- at least one subsystem of the vehicle, including a subsystem unit mounted onto the base of the sub-frame, the at least one subsystem being selected from the group of subsystems consisting of a drive subsystem, a steering subsystem, and a braking subsystem; and
- a VCM-portion of the multi-interface connection-element mounted onto the base of the sub-frame, the VCM-portion being connectable to the vehicle-platform-portion of the multi-interface connection-element and including multiple corresponding connection interfaces for connection to connection interfaces of the vehicle-platform-portion,
- wherein, connection of the VCM-portion to the vehicle-platform-portion of the multi-interface connection-element results in connection of the VCM to the multiple electronic or flow subsystems.

In some embodiments, each of the multiple corresponding connection interfaces is adapted for connection of the VCM to one of the multiple electronic or flow subsystems, each of which is selected from the subsystem group consisting of power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.

In some embodiments, each of the multiple corresponding connector interfaces of the VCM-portion includes a plug adapted to be inserted into a port in the vehicle-platform-portion or a port adapted to receive a plug of the vehicle-platform-portion.

There is also provided, in accordance with an embodiment of the teachings herein, a method for installing a Vehicle Corner Module (VCM) on a vehicle platform of a vehicle, the VCM including a sub-frame having a base and a wall disposed perpendicular to the base, the method including:
- longitudinally aligning the base of the sub-frame of the VCM with a VCM-connection interface of a reference-frame of the vehicle-platform, such that the base is laterally distant from the reference frame and is disposed below the reference frame along the Z-axis;
- without changing the longitudinal alignment between the vehicle-connection interface of the VCM and the reference-frame, moving the VCM laterally toward the reference-frame until the lateral distance between the sub-frame and the reference frame is closed;
- without changing the longitudinal or the lateral alignment between the vehicle-connection interface of the VCM and the reference-frame, moving the VCM upwardly toward the reference-frame until the base of the sub-frame engages the reference frame; and
- mechanically connecting the at least one VCM to the reference-frame by engagement of the vehicle-connection interface with a VCM-connection interface of the reference frame.

In some embodiments, the method further includes connecting the VCM to multiple electronic or flow subsystems of the vehicle by connecting a VCM-portion of a multi-interface connection-element, mounted on the sub-frame, to a vehicle-platform portion of the multi-interface connection-element, forming part of the vehicle platform.

In some embodiments, each of the multiple electronic and/or flow subsystems is selected from the subsystem group consisting of a power supply, a control-circuit, a computerized controller, a network bus, a network interface, a coolant flow subsystem, an oil flow subsystem, and a brake-fluid flow subsystem.

In some embodiments, the mechanically connecting includes placing fasteners which engage the vehicle-connection interface and the VCM-connection interface.

There is further provided, in accordance with an embodiment of the teachings herein, a multi-interface connection-element for connection of multiple electronic or flow vehicle subsystems of a vehicle to a Vehicle Corner Module (VCM) mounted onto a reference-frame of a vehicle platform of the vehicle, the VCM being adapted to regulate motion of the vehicle, the VCM including a sub-frame including a base and a wall disposed transversely to the base, the multi-interface connection-element including:
- a vehicle-platform-portion mountable onto the reference frame of the vehicle, the vehicle-platform-portion including multiple connection interfaces, each adapted to be associated with one of the multiple electronic or flow vehicle subsystems;
- a VCM-portion, mountable onto the base of the sub-frame of the VCM, the VCM-portion including multiple corresponding connection interfaces adapted for connection to the multiple connection interfaces of the vehicle-platform-portion,
- wherein connection of the connection interfaces of the vehicle-platform-portion to the multiple corresponding connection interfaces of the VCM-portion results in connection of the VCM to the multiple electronic or flow subsystems.

In some embodiments, each of the multiple electronic or flow subsystems is selected from the subsystem group consisting of: a power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.

In some embodiments, connection of the connection interfaces of the vehicle-platform-portion to the multiple corresponding connection interfaces of the VCM-portion results in connection of at least one VCM-subsystem to at least one of the multiple electronic or flow subsystems.

In some embodiments, the at least one VCM-subsystem includes at least one of a drive subsystem, a steering subsystem, a braking subsystem, a suspension subsystem, a VCM controller, and a cooling subsystem.

In some embodiments, the VCM-portion is mounted onto a portion of the base of the VCM which is distal to a wheel-hub assembly of the VCM, the multi-interface connection-element further including a motion actuator extending between the base of the sub-frame and the wall of the sub-frame, and adapted to actuate motion of the VCM-portion relative to the vehicle-platform-portion for connection thereof.

In some embodiments, the motion actuator is disposed at a different portion of the sub-frame than the VCM-portion, such that motion of the VCM-portion can be actuated even when the VCM-portion is inaccessible.

In some embodiments, the motion actuator includes a fastener connected to the VCM-portion by a connector cable, and wherein motion of the VCM-portion is actuated by operating the fastener to transfer movement actuation forces from the fastener to the VCM-portion.

In some embodiments, the motion actuator includes a fastener connected to the VCM-portion by a fluid-flow conduit, and wherein motion of the VCM-portion is actuated by transmitting a fluid through the fluid-flow conduit from the fastener to the VCM-portion.

In some embodiments, a connection-assembly connecting the VCM-portion to a sub-frame of the VCM includes at least one spring, adapted to apply force on VCM-portion toward the vehicle-platform-portion.

There is a additionally provided, in accordance with an embodiment of the teachings herein, a method of connecting at least one VCM-subsystem mounted onto a Vehicle Corner Module (VCM) to at least one electronic or flow subsystem mounted onto a vehicle platform of a vehicle, the VCM including a sub-frame having a base portion and a wall portion transverse to the base portion, the method including connecting a VCM-portion of a multi-interface connection-element, mounted onto the base of the sub-frame of the VCM and connected to the at least one VCM-subsystem, to a vehicle-platform-portion of the multi-interface connection-element forming part of the vehicle platform and connected to the at least one vehicle-subsystem, thereby to form a connection between the at least one VCM-subsystem and the at least one electronic or flow subsystem,
- wherein each of the VCM-portion and the vehicle-platform-portion of the multi-interface connection-element includes a plurality of connection interfaces, each associated with one of a plurality of electronic or flow subsystems.

In some embodiments, each of the multiple electronic and/or flow subsystems is selected from the subsystem group consisting of a power supply, a control-circuit, a computerized controller, a network bus, a network interface, a coolant flow subsystem, an oil flow subsystem, and a brake-fluid flow subsystem.

In some embodiments, the connecting of the VCM-portion and the vehicle-platform-portion includes moving the VCM-portion relative to the vehicle-platform-portion until they are connected. In some embodiments, only one of the VCM-portion and the vehicle-platform-portion is movable, and the other is stationary.

In some embodiments, moving the VCM-portion relative to the vehicle-platform-portion includes actuating motion of the VCM-portion by a mechanical mechanism that extends between the base of the sub-frame of the VCM and the wall of the sub-frame of the VCM. In some embodiments, the mechanical mechanism actuating motion of the VCM-portion is remote to the location of the VCM-portion.

In some embodiments, the mechanical mechanism includes a fastener connected to the VCM-portion by a connector cable, and wherein the actuating motion includes operating the connector fastener to transfer movement actuation forces from the fastener to the VCM-portion.

In some embodiments, the mechanical mechanism includes a fastener connected to the VCM-portion, and wherein actuating motion includes operating the fastener to transmit movement actuation forces to the VCM portion by fluid communication via the conduit.

In some embodiments, actuation of motion of at least one of the VCM-portion and the vehicle-platform portion is by an electrical motor.

In some embodiments, the connecting is carried out from an area of the VCM disposed between the wall of the sub-frame and a wheel-hub assembly of the VCM, regardless of the positioning of the VCM-connector within the VCM.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

DETAILED DESCRIPTION OF SOME EMBODIMENTS OF THE INVENTION

Figure 1:
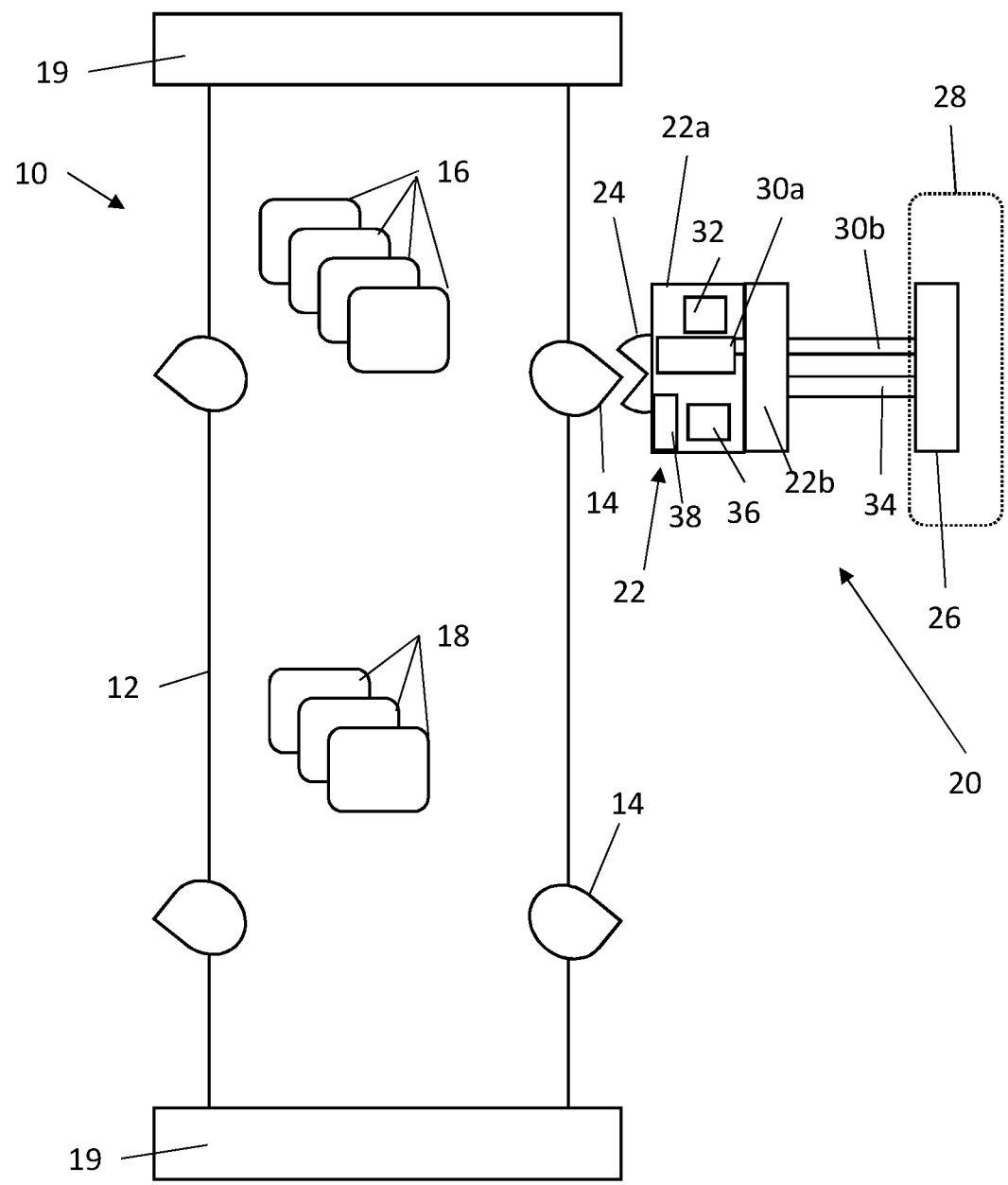
FIG. 1 is a schematic block diagram of a VCM and a vehicle platform adapted to have the VCM mounted thereon, according to an embodiment of the disclosed technology.

The invention, in some embodiments, relates to methods and systems for installing Vehicle Corner Modules (VCMs) on a reference frame, or platform, of the vehicle. The VCMs of the invention have a sub-frame, having a base portion and a wall portion disposed transversely (e.g. substantially perpendicularly) to the base portion. At least one sub-system of the vehicle is mounted to the base portion and is separated from the wall portion. Such a structure may enable physical separation between the wheel and various subsystems of the VCM. Such a structure may enable at least some subsystems of the VCM to be mounted within the footprint of the reference frame. Such a structure also allows for efficient and safe transfer of loads (e.g. lateral and/or vertical) received from the wheel toward the vehicle platform. In some embodiments, the wall portion is designed to hold and transfer such loads while bypassing the sub-systems attached to the base portion.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

Unless otherwise indicated, a "vehicle corner module" or "VCM" as used herein means an assembly for supporting a wheel of a vehicle and regulating the motion of a vehicle according to any of the embodiments disclosed herein. The VCM assembly includes components such as (and not exhaustively): steering systems, suspension systems, braking systems including hydraulic subsystems, gearing assemblies, drive motors, drive shafts, wheel hub assemblies, controllers, communications arrangements, and electrical wiring. In some embodiments, a VCM can include a wheel and tire. A VCM can be mounted to a 'reference frame' of a vehicle, e.g., a chassis or similar vehicle frame or a platform. When a VCM is described as being installed in/on a vehicle, then the VCM is mounted to the reference frame. A VCM may include a 'sub-frame' to which some or all of the VCM components are mounted or otherwise attached. In some cases, the sub-frame mediates between the reference frame and the various VCM components.

The term 'sub-frame' should be understood to mean any rigid frame or one or more structural elements in fixed combination. The 'sub' prefix is intended to distinguish the sub-frame from a main frame or reference frame of the vehicle. A VCM may or may not include one or more electric motors and/or the wheel itself (and tire).

When used in this specification and in the claims appended hereto, the word "vehicle" is to be understood as referring to a vehicle having one or more wheels. Non-limiting examples of a vehicle, according to this definition, are a vehicle with motive power provided by an onboard engine, and an 'electric vehicle' powered, when in motion, by one or more electric motors and a battery or other energy storage device onboard. The battery need not be provided with the vehicle, or installed in the vehicle, unless and until the vehicle is in motion. The word 'vehicle' should also be understood as encompassing a "vehicle platform" comprising at least a chassis (or other 'reference frame' to which VCMs can be mounted) and one or more wheels. A 'vehicle platform' need not necessarily comprise, at the time of providing the vehicle platform, all of the accoutrements required for transport of passengers and/or cargo such as vehicle-body components or interior furnishings.

The term "controller" as used herein means a computing device configured for monitoring, controlling, regulating and/or actuating one or more components, systems or subsystems. A controller should be understood to include any or all of (and not exhaustively): one or more processors, one or more computer-readable media, e.g., transient and/or non-transient storage media, communications arrangements, a power source and/or a connection to a power source, and firmware and/or software. When used herein in a hyphenated expression such as vehicle-controller or VCM-controller, the term means a controller for controlling the vehicle and/or components and/or subsystems of the vehicle, or a controller for controlling the VCM and/or components and/or subsystems of the VCM, respectively. Unless specifically noted otherwise, a controller is installed in or on the controlled element (vehicle, VCM, etc.) while a "control unit" is like a controller but is not installed in or on the controlled element. For example, a VCM-controller is located in or on the VCM, while a VCM control unit is not, and may be located elsewhere on the vehicle, e.g., on the chassis unit. Controllers (and control units) can be programmed in advance, e.g., by having program instructions stored in the computer-readable media for execution by one of more processors of the controller. Thus, a controller 'configured' to perform a function is equivalent herein to the controller being programmed, i.e., having access to stored program instructions for execution, to perform the function.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figures 2A, 2B:
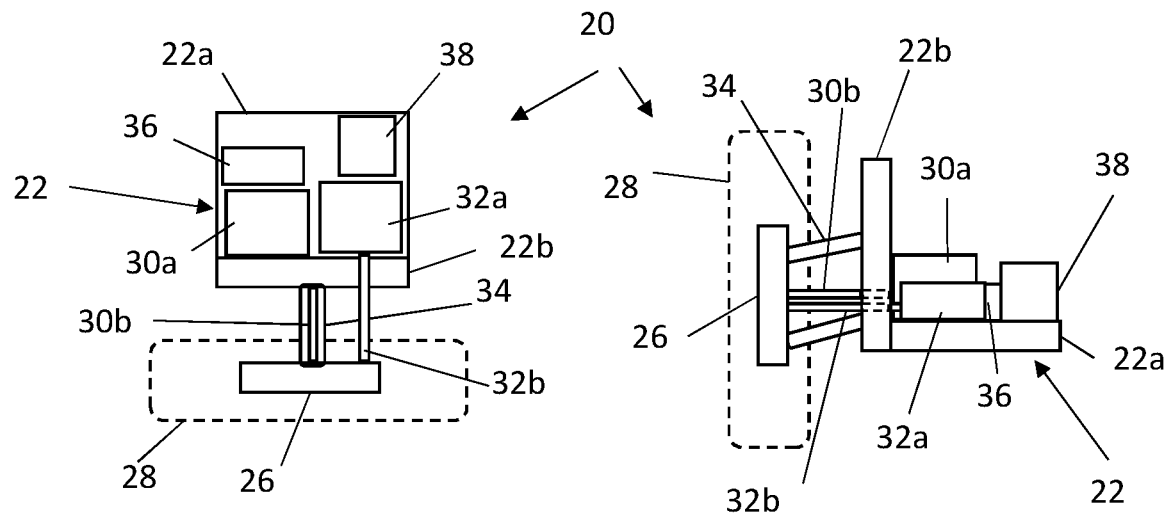
FIGS. 2A and 2B are, respectively, schematic top-view and side-view diagrams of a VCM, according to some embodiments of the disclosed technology.

Reference is now made to FIG. 1, which is a schematic block diagram of a VCM and a vehicle platform adapted to have the VCM mounted thereon, according to an embodiment of the disclosed technology. Reference is additionally made to FIGS. 2A and 2B, which are, respectively, schematic top-view and side-view diagrams of a VCM, according to some embodiments of the disclosed technology, and to FIGS. 7A and 7B, which are, respectively, schematic top-view and side-view diagrams of the VCM installed onto a reference frame of a vehicle platform, according to some embodiments of the disclosed technology.

As seen in FIG. 1, a vehicle platform 10, which is adapted to have a vehicle capsule mounted thereon, includes a vehicle reference-frame 12, having four VCM-connection interfaces 14 adapted for connection to VCMs. In the illustrated embodiment, all four VCM-connection interfaces 14 are identical to one another. However, in some embodiments, a single reference-frame may include multiple different types of VCM-connection interfaces, for example for connection to different types of VCMs.

Vehicle platform 10 may include one or more electronic subsystems 16 mounted onto reference frame 12, which may include a power supply of the vehicle, a control circuit of the vehicle, a computerized controller of the vehicle, a network bus of the vehicle, and a network interface of the vehicle. Vehicle platform 10 may further include one or more fluid flow subsystems 18 mounted onto reference frame 12, which may include a coolant flow subsystem, an oil flow subsystem, and a brake-fluid flow subsystem. In some embodiments, reference-frame 12 may also have attached thereto front and/or rear bumpers 19. Examples of subsystems 16 and 18 are described in PCT Patent Application No. PCT/IB2020/062598 and in U.S. Pat. No. 10,919,575, both of which are incorporated by reference as if fully set forth herein.

A VCM 20, for regulating motion of the vehicle, is connectable to reference frame 12, as explained herein. According to some embodiments, VCM 20 includes a sub-frame 22, including a base 22a and a lateral wall 22b, substantially perpendicular to base 22a. Sub-frame 22 includes a vehicle-connection interface 24 adapted for reversible mechanical connection to VCM-connection interface 14 of reference frame 12. Vehicle-connection interface 24 may be disposed on base 22a, on lateral wall 22b, or may have portions on each of the base and the lateral wall of sub-frame 22.

VCM 20 further includes a wheel-hub assembly 26, adapted to have a wheel 28 mounted thereon. Typically, wheel-hub assembly 26 is mounted on, or functionally associated with, lateral wall 22b of sub-frame 22.

In some embodiments, lateral wall 22b of sub-frame 22 is disposed between base 22a and wheel-hub assembly 26. In some embodiments, at least a portion of base 22a of sub-frame 22 is within a cylindrical footprint of wheel 28, as seen clearly in FIGS. 2B and 3B.

Sub-frame 22 has mounted thereon one or more subsystems of the vehicle, each comprising mechanical and/or electrical components. Some of the subsystems may also be attached to wheel-hub assembly 26.

The subsystems included in the VCM may include a drive subsystem 30, a steering subsystem 32, a suspension subsystem 34, and/or a braking subsystem 36. Sub-frame 22 may also include a VCM-controller 38, adapted to control operation of one or more of subsystems 30, 32, 34, and 36, and/or to communicate with one or more electronic subsystems 16 of the vehicle, such as with a computerized controller or a network interface of the vehicle.

In some embodiments, at least one drive subsystem unit of drive subsystem 30 is mounted between lateral wall 22b and wheel-hub 26. In some embodiments, suspension subsystem 34 is mounted between lateral wall 22b and wheel-hub 26.

In some embodiments, at least one of drive subsystem 30, steering subsystem 32, and braking subsystem 36, or at least one subsystem unit of these subsystems, is mounted onto base 22a of sub-frame 22. In some embodiments, more than one of, or all of, drive subsystem 30, steering subsystem 32, and braking subsystem 36, or at least one subsystem unit of each of these subsystems, are mounted onto base 22a of sub-frame 22. According to some embodiments, a power source or an actuator of at least one of drive subsystem 30, steering subsystem 32, and braking subsystem 36 is mounted onto base 22a of sub-frame 22. In some embodiments, drive subsystem 30 actuator includes a drivetrain having a motor and/or a transmission assembly mounted onto base 22a. In some embodiments, steering subsystem 32 includes a steering actuator mounted onto base 22a. In some embodiments, braking subsystem 36 includes a brake pressure source which is a brake pump and/or a fluid accumulator mounted onto base 22a.

In some embodiments, at least one of the power sources or the actuators of the subsystems mounted onto base 22a, and in some embodiments all the power sources or the actuators of the subsystems mounted onto base 22a, are physically detached from lateral wall 22b. Stated differently, at least one subsystem unit of at least one subsystem is mounted onto base 22a and does not engage lateral wall 22b. In some embodiments, a drivetrain of drive subsystem 30 is mounted onto base 22a, and is physically detached from lateral wall 22b. In some embodiments, a steering actuator of steering subsystem 32 is mounted onto base 22a, and is physically detached from lateral wall 22b. In some embodiments, a brake pressure source of braking subsystem 36 is mounted onto base 22a, and is physically detached from lateral wall 22b. In some embodiments, at least one subsystem unit of at least one of subsystems 30, 32, and 36 is mounted onto base 22a adjacent a first side of wall 22b, and wheel-hub assembly is disposed adjacent a second, opposing side of wall 22b, such that the wall 22b is disposed between the wheel-hub assembly and the subsystem unit(s).

Figures 3A, 3B:
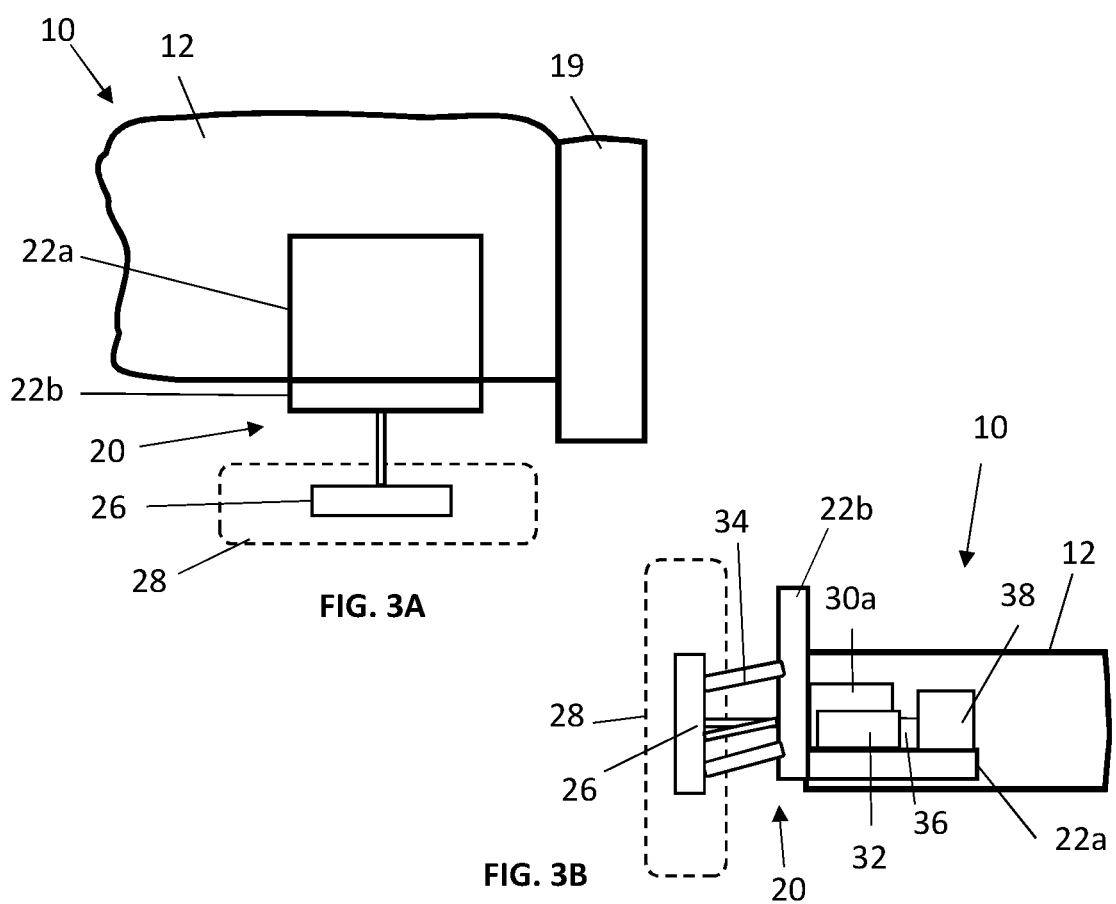
FIGS. 3A and 3B are, respectively, schematic top-view and side-view diagrams of the VCM of FIGS. 2A and 2B installed onto a reference frame of a vehicle platform, according to some embodiments of the disclosed technology.

As seen in FIG. 3B, in some embodiments, when VCM 20 is attached to reference frame 12, the subsystems disposed on base 22a are arranged within a VCM cavity of the reference frame. In some such embodiments, the VCM cavity is defined as, or forms part of, a wheel well of the vehicle platform. In some such embodiments, the VCM cavity is defined between a top surface of reference-frame 12 and a bottom surface of reference-frame 12. In some such embodiments, the only portion of sub-frame 22 which is external to the footprint of reference frame 12 is lateral wall 22b. In other embodiments, for example as shown herein with respect to FIGS. 10A to 10C, the entirety of sub-frame 22 is within the footprint of reference frame 12, when VCM is installed on the reference frame. In some embodiments, the wall 22b is adapted to attach to a wheel fender (or wheel arc) attached to the vehicle platform frame, for example as shown in FIGS. 10A to 11B.

As explained in further detail hereinbelow, in some embodiments, when wheel 28 is mounted on wheel-hub assembly 26, at least a portion of vehicle-connection interface 24 of VCM 20, and in some embodiments the entirety thereof, is disposed within a cylindrical footprint of the wheel. In the context of the present application, the "cylindrical footprint of the wheel" is the area resulting from projection of the wheel into another plane, parallel to a rotational plane of the wheel.

As explained in further detail hereinbelow, vehicle-connection interface 24 forms part of sub-frame 22. When VCM 20 is connected to reference-frame 12 by engagement of vehicle-connection interface 24 with the VCM-connection interface 14, base 22a of sub-frame 22 may be disposed at a height between a height of an upper surface of the reference-frame and a height of a lower surface of the reference-frame. Even though the vehicle-connection interface is between the upper and lower surfaces of the reference-frame, there may be portions of the sub-frame which are outside of this range (e.g. wall 22b). In some embodiments, the height of base 22a is between the heights of the upper and lower surfaces in a localized manner. In such embodiments, base 22a is between the height of the upper and lower surfaces, within a distance of 20-50 cm from vehicle-connection interface 24. However, in other, more distant portions of the reference frame, the upper and lower surfaces may be at different heights, such that the vehicle-connection interface is not between the upper and lower surfaces in those more distant portions.

Drive subsystem 30 may include any or all of the mechanical and/or electrical components required for actuating a drive shaft to rotate wheel 28, or other wheels of the vehicle, to drive the vehicle, including, and not exhaustively: an electric drive motor 30a, a driveshaft 30b actuated by motor 30a, and a transmission assembly to transmit the rotation to wheel 28 including, optionally, a single-gear or multi-gear transmission, as well as sensors such as a wheel speed sensor (in a non-limiting example, a rotary encoder). In some embodiments, the drive motor is included in the VCM, and in some embodiments, the drive motor is on the vehicle, e.g., installed on reference frame 12. In some embodiments, the drive motor is mounted on base 22b of sub-frame 22 and thereby is a sprung mass.

In embodiments, VCM-controller 38 is adapted to regulate an output of the motor and/or a rotational velocity of wheel 28 and/or a selection of a transmission gear, in response to instructions received via electrical inputs from the vehicle, e.g., from a driver-operated drive mechanism (e.g. an accelerator pedal) or an autonomous driving unit.

In embodiments, drive subsystem 30 can be used in a regenerative braking scheme. In another example, the regenerative braking is boosted by friction braking (or vice versa), i.e., regular operation of braking subsystem 36.

In some embodiments, 'cooperation' of drive subsystem 30 and braking subsystem 36 in combining regenerative braking with friction braking can be controlled by VCM-controller 38. In yet another example, in which the VCM-controller is configured (e.g., programmed) to control multiple subsystems in cooperation with each other, steering subsystem 32 can be used to assist in braking, i.e., in cooperation with the braking system, for example by turning the wheels so as to increase friction with a roadway, whether by steering symmetrically by having the opposing wheels turn in the same direction in tandem, or asymmetrically where the opposing wheels do not turn in tandem. In a similar example, the VCM-controller controls steering subsystem 32 in concert with the braking system to mitigate the effect of brake pull caused by steering, a phenomenon also known as 'brake steer' or 'steering drift'. In yet another example, the VCM-controller controls, in concert, the drive system (with respect to regenerative braking), the braking system (with respect to friction braking) and the steering system (with respect to 'braking-by-steering') to achieve a desired braking effect.

Steering subsystem 32 may include any or all of the mechanical and/or electrical components required for steering, i.e., pivoting the wheel of the vehicle around a steering axis, including, and not exhaustively: a steering actuator 32a, steering rods 32b, steering system controller or control unit, steering inverter and wheel-angle sensor.

In some embodiments, VCM-controller 38 receives steering instructions as electrical (including electronic) inputs from the vehicle, e.g., from a driver-operated steering mechanism or an autonomous steering unit, and carries out the instructions by causing, responsively to the received instructions, the motion of a steering rod, e.g., via a steering actuator, to effect the turning of the wheel, for example, by regulating a current and voltage transmitted to the steering actuator and/or transmitting high-level instructions to a steering-system controller. The steering actuator can receive electrical power from an external power source ('external' meaning external to the VCM), such as a power supply installed in or on the reference frame.

Suspension subsystem 34 may optionally include an active suspension system controllable by the VCM-controller 38 (e.g., via a suspension-system control unit).

Braking subsystem 36 may include any or all of the mechanical and electrical components for actuating a brake assembly (e.g., brake disk, brake caliper, etc.) including, optionally, one or more of a brake fluid pump, and a brake fluid source.

In some embodiments, VCM controller 38 is configured to regulate an output of the braking system, e.g., cause a braking action, in response to instructions received via electrical inputs from the vehicle, e.g., from a driver-operated braking mechanism (e.g. a brake pedal) or an autonomous braking unit.

In some embodiments, the plurality of VCM subsystems in VCM 20 includes all of subsystems 30, 32, 34, and 36. In other embodiments, the plurality of VCM subsystems in a given VCM 20 may include two or three of the subsystems.

In some embodiments, the connection interface between VCM 20 and reference frame 12 has one or more degrees of freedom. In such embodiments, the connection of the VCM to the reference frame is configurable, for example to control or configure any one of the caster angle of the wheel, the camber angle of the wheel, and the toe angle of the wheel.

Figure 4:
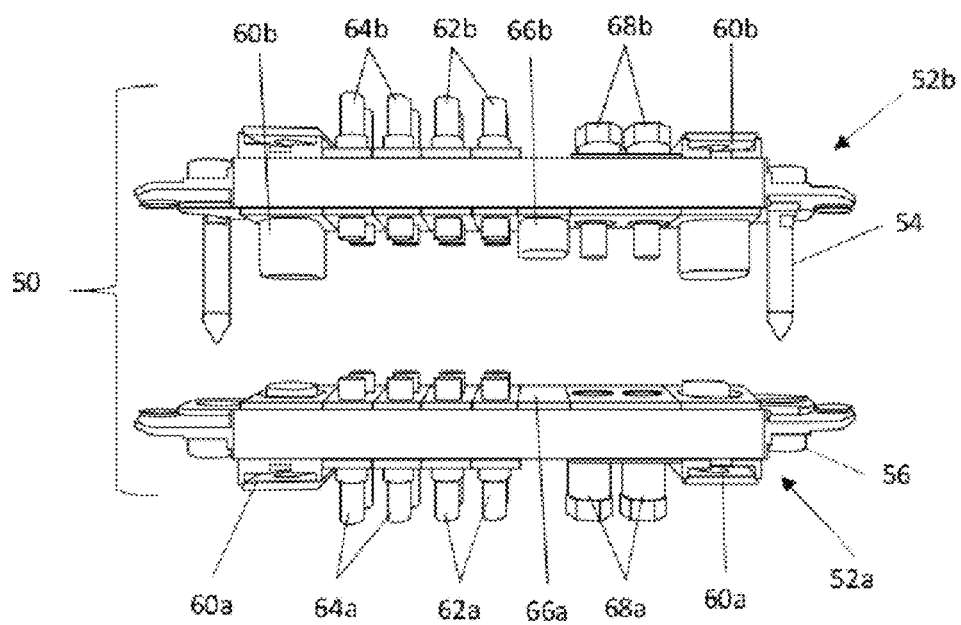
FIG. 4 is a photograph of a multi-interface connection-element for connection of a VCM to vehicle subsystems installed on a reference frame of the vehicle platform, according to an embodiment of the disclosed technology.
Figure 5:
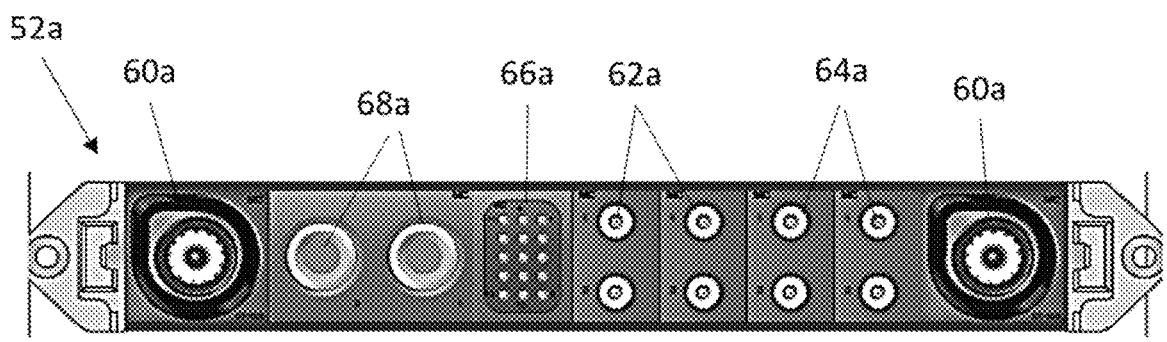
FIGS. 5 and 6 are schematic images of connection interfaces of respective vehicle-platform- and VCM-portions of the multi-interface connection-element of FIG. 4.
Figure 6:
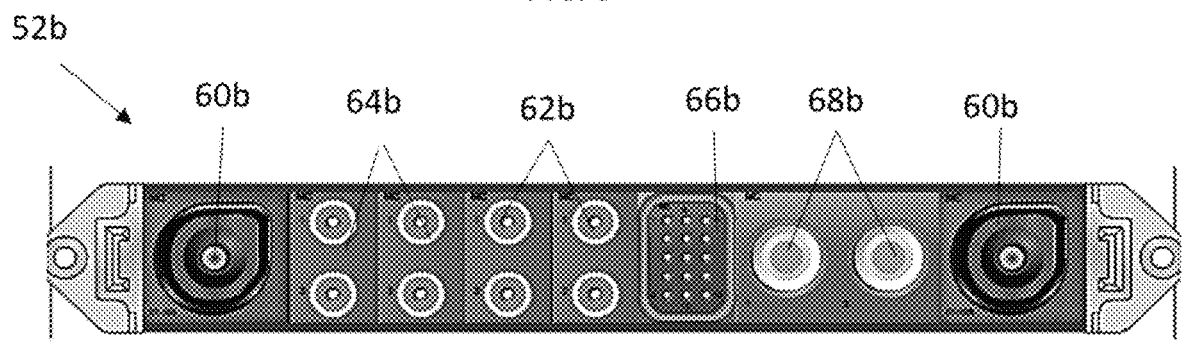

Reference is now made to FIG. 4, which is a photograph of a multi-interface connection-element 50 for connection of VCM subsystems, such as subsystems of VCM 20 of FIGS. 1 to 3B, to vehicle subsystems installed on a reference frame of the vehicle platform, such as subsystems 16 and 18 of FIG. 1, according to an embodiment of the disclosed technology. Reference is additionally made to FIGS. 5 and 6, which are schematic images of connection interfaces of respective vehicle-platform- and VCM-portions of the multi-interface connection-element 50 of FIG. 4.

As seen, multi-interface connection-element 50 includes a vehicle-platform-portion 52a connectable to a reference frame of a vehicle platform, such as reference frame 12 of FIG. 1, and a VCM portion 52b connectable to a sub-frame of a VCM, such as sub-frame 22 of FIG. 1.

In some embodiments, VCM portion 52b may be mounted onto base 22a of sub-frame 22. As explained in further detail hereinbelow, in some embodiments, VCM portion 52b may be disposed at a distal portion of base 22a, which is remote from wheel-hub assembly 26. Such placement of the VCM portion requires remote access to the VCM portion 52b, for connection or operation thereof. Methods of such remote access and/or connection are described hereinbelow, for example with respect to FIG. 7. Such remote access and/or connection facilitate maintenance of a safe and effective connection between the VCM subsystems and the vehicle platform.

Vehicle-platform-portion 52a and VCM-portion 52b are reversibly connectable to each other, for example by insertion of alignment pins 54 extending from one of the portions into corresponding bores 56 in the other portion. Each of portions 52a and 52b includes a plurality of connection interfaces, such that the two pluralities of connection interfaces correspond to one another.

For example, in the illustrated embodiment, vehicle-platform-portion 52a includes a pair of high voltage connectors 60a, two pairs of 12V battery connectors 62a, two pairs of 48V battery connectors 64a, a vehicle Controller Area Network (CAN) bus connector 66a, and a pair of coolant flow connectors 68a. VCM-portion 52b includes corresponding high voltage connectors 60b, 12V battery connectors 62b, 48V battery connectors 64b, vehicle CAN bus connector 66b, and coolant flow connectors 68b. In some embodiments, the connection interfaces of the portions of multi-interface connection-element 50 may include connection interfaces connected to any one or more of:

a power supply mounted on the vehicle platform;
a control-circuit mounted on the vehicle platform;
a computerized controller mounted on the vehicle platform;
a network bus mounted on the vehicle platform;
a network interface mounted on the vehicle platform;
a coolant flow subsystem mounted on the vehicle platform;
an oil flow subsystem mounted on the vehicle platform; and
a brake-fluid flow subsystem mounted on the vehicle platform.

Mechanical connection of vehicle-platform-portion 52a and VCM-portion 52b of multi-interface connection-element 50 results in connection of corresponding connection interfaces within the two portions. The connection interfaces of vehicle-platform-portion 52a are connected to various vehicle platform subsystems mounted onto the reference frame, such as subsystems 16 and 18 of FIG. 1. The connection interfaces of VCM-portion 52b are connected to various subsystems mounted onto the sub-frame of the VCM, such as subsystems 30, 32, 34, 36, and 38 of FIG. 1. As such, connection of the two portions of multi-interface connection-element 50 result in functional connection between the VCM subsystems and the vehicle subsystems. For example, connection to a vehicle power subsystem can be used to provide power to one or more of the VCM subsystems. As another example, connection to a coolant flow subsystem can be used to cool a motor mounted onto the VCM as part of drive subsystem 30 of FIG. 1, and connection to a brake-fluid flow subsystem can be used by braking subsystem 36 of FIG. 1.

Figure 7:
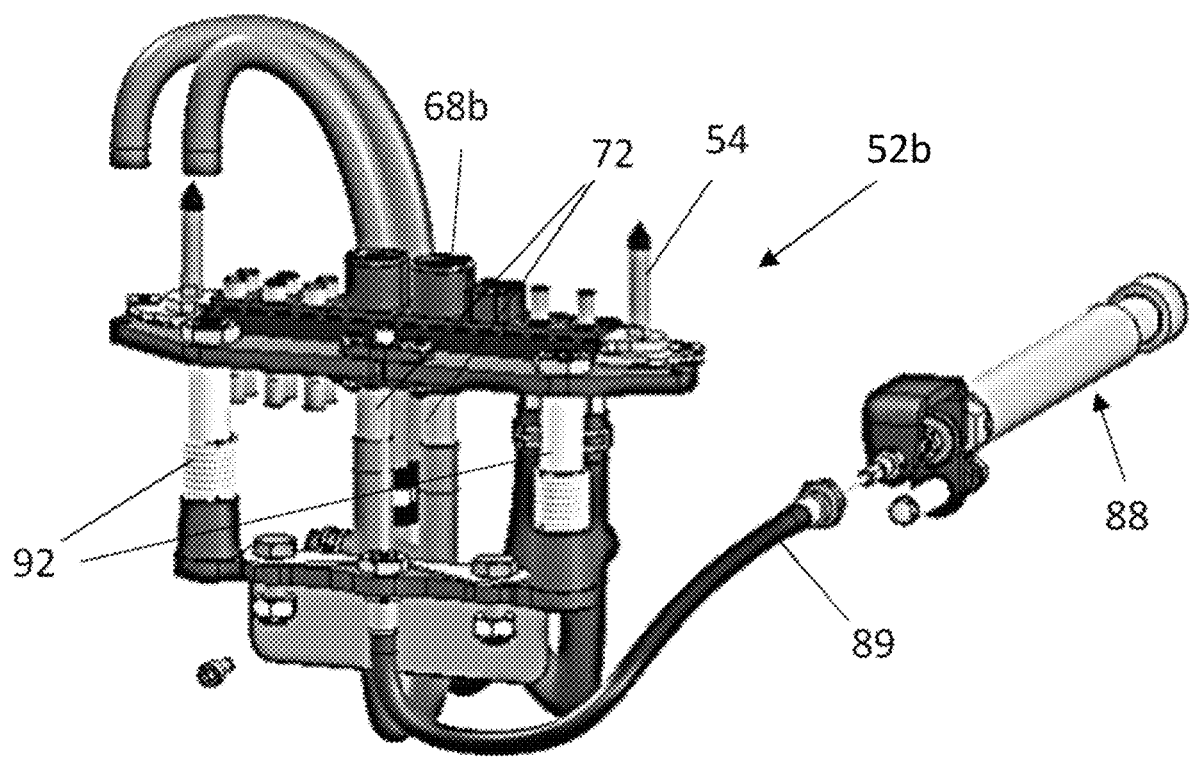
FIG. 7 is a perspective view illustration of a VCM-portion of the multi-interface connection-element of FIG. 4.

Reference is now made to FIG. 7, which is a perspective view illustration of VCM-portion 52b of multi-interface connection-element 50 similar to that shown in FIG. 4, including connection to various subsystems mounted onto the reference frame of the vehicle platform. It will be appreciated that the specific connections included in the connection interfaces of the two portions of a multi-interface connection-element, and the arrangement of those connection interfaces within each portion, may differ in different implementations of the multi-interface connection-element, in accordance with the requirements of a specific vehicle, vehicle platform, VCM, or implementation.

As seen, coolant flow connectors 68b are connected to pipes 72, which are connectable to a cooling subsystem of the VCM. The cooling subsystem may form part of, or be functionally associated with, the drive subsystem 30 of VCM 20.

According to some embodiment, engaging VCM-portion 52b with vehicle-platform-portion 52a is by moving one or more of portions 52a/52b toward each other until being in a connection state. In some embodiments, one of portions 52a/52b is movable and the other is stationary. As shown in the example embodiment of FIG. 7, VCM-portion 52b is movable and is actuated to connect with vehicle-platform-portion 52a (FIG. 4) by a mechanical mechanism that may extend between a back portion of the VCM and a front portion of the VCM. The mechanical mechanism allows the movement of VCM-portion 52b between a connected state and a disengaged state with the vehicle-platform-portion while the actuation of this movement is remote of the location of VCM-portion 52b (e.g. from the front side of the VCM, while VCM-portion 52b is on the back side). This allows the installation and connection of all VCM subsystems and sub-frame with the vehicle platform, all from one side of the VCM.

According to some embodiments, the mechanical mechanism includes a connector fastener 88 connected to VCM-portion 52b by connector cable 89 adapter to transfer movement actuation forces from fastener 88 to VCM-portion 52b. In some embodiments actuation forces are transmitted between fastener 88 and VCM-portion 52b using fluid (e.g. pneumatic, hydraulic) and connector cable 89 is substituted by a tube filled with such fluid. In some embodiments fastener 88 is based on bolt screwed into a bore in sub-frame 22. In some embodiments, fastener 88 is a lever applying forces on cable 89.

In some embodiments, VCM-portion 52b, or a connection thereof to sub-frame 22, may include one or more springs 92, shown clearly in FIG. 7. Springs 92 are adapted to force VCM-portion 52b toward the vehicle-platform-portion, or vice versa, to assist in forming and/or maintaining an operational connection therebetween, and particularly between connection interfaces thereof.

In some embodiments, actuation of VCM-portion 52b is by an electrical motor. In some embodiments, the control of the mechanical or electrical actuation of VCM-portion 52b is by a remove controller and not by a mechanical fastening.

Figure 8A:
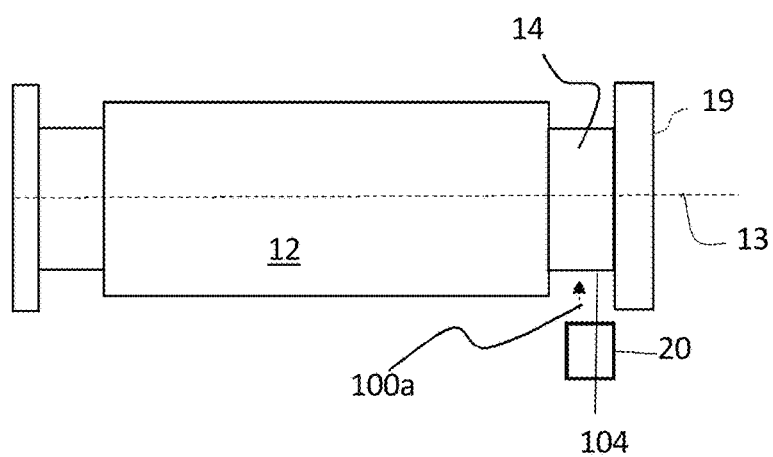
FIGS. 8A and 8B are, respectively, schematic top-view and side-view diagrams of a first step of installation of the VCM of FIGS. 2A and 2B onto the reference-frame of the vehicle platform, according to some installation methods.
Figure 8B:
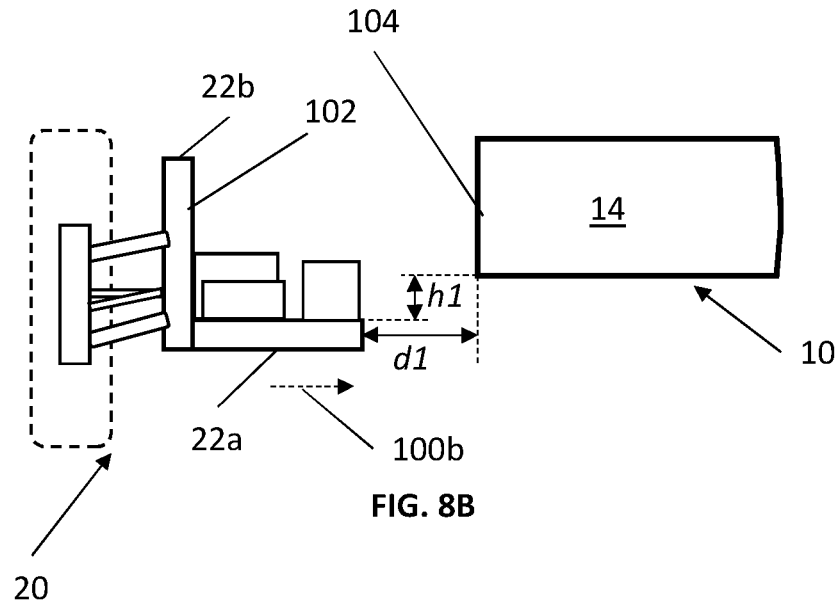
Figure 8C:
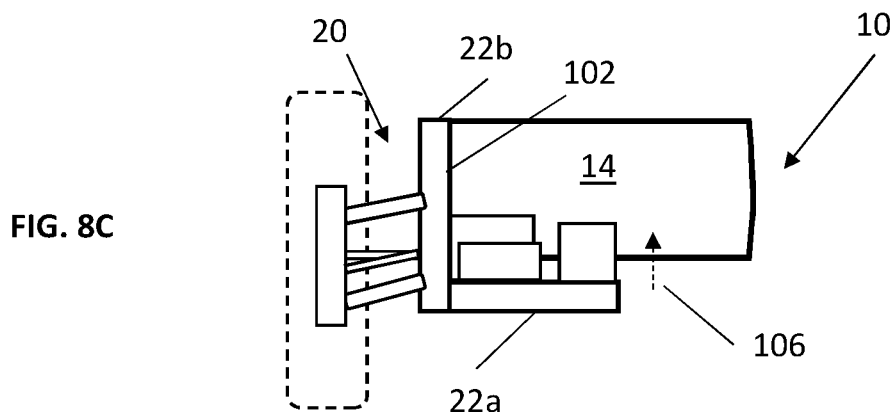
FIGS. 8C and 8D are schematic side-view diagrams of additional steps of installation of the VCM of FIGS. 2A and 2B onto the reference frame of the vehicle platform, according to some installations methods.
Figure 8D:
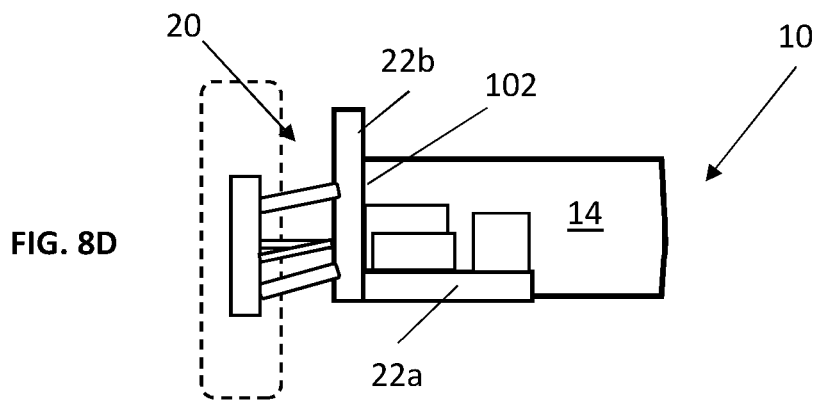

Reference is now made to FIGS. 8A and 8B, which are, respectively, schematic top-view and side-view diagrams of a first step of installation of L-shaped VCM 20 of FIGS. 2A to 2B onto reference-frame 12 of vehicle platform 10, shown in FIG. 1, according to some installation methods, and to FIGS. 8C and 8D, which are schematic side-view diagrams of additional steps of installation of L-shaped VCM 20 onto reference frame 12, according to some installations methods. Reference numerals used in the description of FIGS. 8A to 8D correspond to reference numerals shown in FIGS. 1 to 3B.

In the embodiment of FIGS. 8A to 8D, reference frame 12 includes, as VCM-connection interface, a VCM-receiving segment 14 extending next to bumper 19 of the vehicle platform. Segment 14 has a bottom surface suitable for receiving base 22a of VCM 20, as shown schematically in FIG. 8D.

As seen in FIG. 8A, initially, VCM 20 is arranged longitudinally along reference frame 12, so that it is aligned longitudinally with narrower segment 14. As seen in FIG. 8B, at this first step of alignment, a distance d1 exists between VCM 20 and segment 14, in a lateral direction perpendicular (or substantially perpendicular) to a longitudinal x-axis 13 of reference frame 12. In this arrangement, base 22a of sub-frame 22 faces inwardly, toward platform 12, while wheel-hub 26 faces outwardly away from platform 12. Base 22a is also disposed vertically below segment 14 of reference frame 12, such that a height difference hi exists between an upper surface of base 22a and a lower surface of segment 14.

For installation of VCM 20, VCM 20 is moved laterally toward segment 14, as indicated by arrows 100a and 100b in FIGS. 8A and 8B, respectively. The VCM is moved laterally until an inner surface 102 of wall 22b engages a lateral surface 104 of segment 14, as seen in FIG. 8C. Subsequently, VCM 20 is moved upward along the z-axis, in the direction of arrow 106 shown in FIG. 8C, until base 22a is attached to a lower surface of reference frame 12 (or of segment 14), as shown in FIG. 8D. Attachment of base 22a to the lower surface of reference frame 12 (or of segment 14) may be by securing the base 22a to the reference frame when the lower surface of base 22a is flush with a lower surface of reference frame 12. In some embodiments, attachment of base 22a to the lower surface of reference frame 12 (or of segment 14) may be by securing base 22a to the reference frame when an upper surface of base 22a is flush with a lower surface of reference frame 12.

Alternately, VCM 20 may be moved upward or until base 22a and subsystems disposed thereon are settled in their designated locations within segment 14, for example in designated cavities or indentations in reference frame 12. In some embodiments, installation may be completed by securing sub-frame 22 of VCM 20 to reference frame 12 (or to segment 14), for example using suitable fasteners. As explained hereinbelow, securing of sub-frame 22 to reference frame 12 may include securing base 22a, wall 22b, or both portions of sub-frame 22, to reference frame 12 (or to segment 14).

Removal of VCM 20, for example for maintenance or for swapping thereof, includes reversing the steps shown in FIGS. 8A to 8D. Stated differently, to remove VCM 20 from reference frame 12, one would remove the fasteners holding reference frame 12 and sub-frame 22 together, and would then lower sub-frame 22 and pull it laterally away from reference frame 12.

Reference is now made to FIGS. 9A, 9B, 9C, and 9D, which are, respectively, a perspective view illustration and top, front, and side view planar illustrations of an L-shaped VCM 120 according to some embodiments of the disclosed technology. VCM 120 is substantially similar to VCM 20 described hereinabove, with like numbers representing like elements. Reference is further made to FIGS. 9E and 9F, which are front and back view perspective illustrations of an L-shaped sub-frame 122, suitable for use in VCM 120 of FIGS. 9A to 9D, according to some embodiments of the disclosed technology As seen, VCM 120 includes L-shaped sub-frame 122, which includes a base 122a and a lateral wall 122b, substantially perpendicular to base 122a.

Figure 9A:
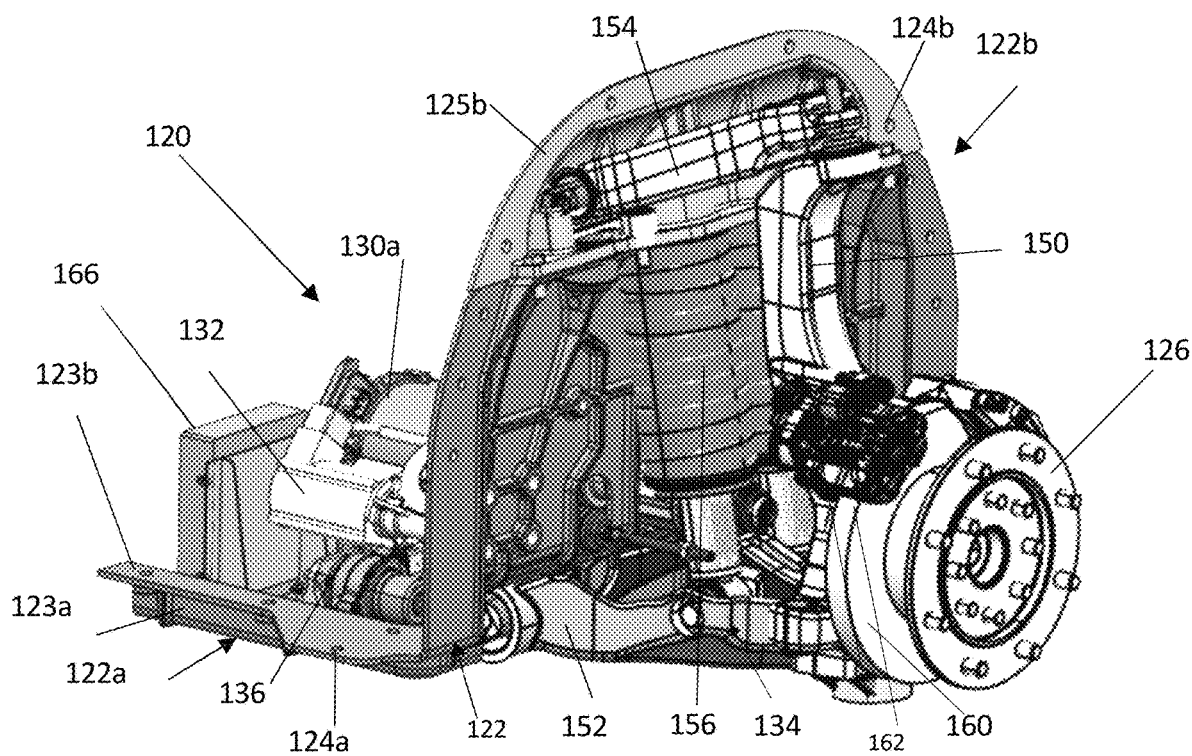
FIGS. 9A, 9B, 9C, and 9D are, respectively, a perspective view illustration and top, front, and side view planar illustrations of a VCM according to some embodiments of the disclosed technology.
Figure 9B:
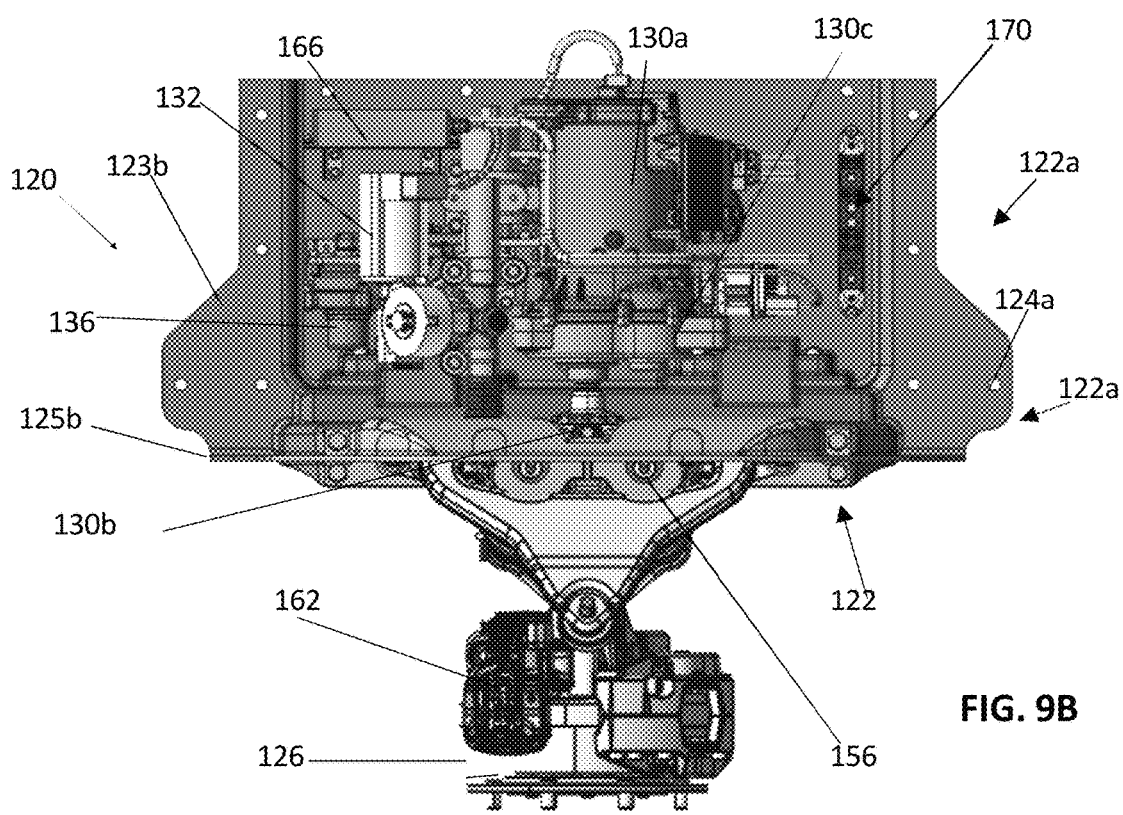
Figure 9C:
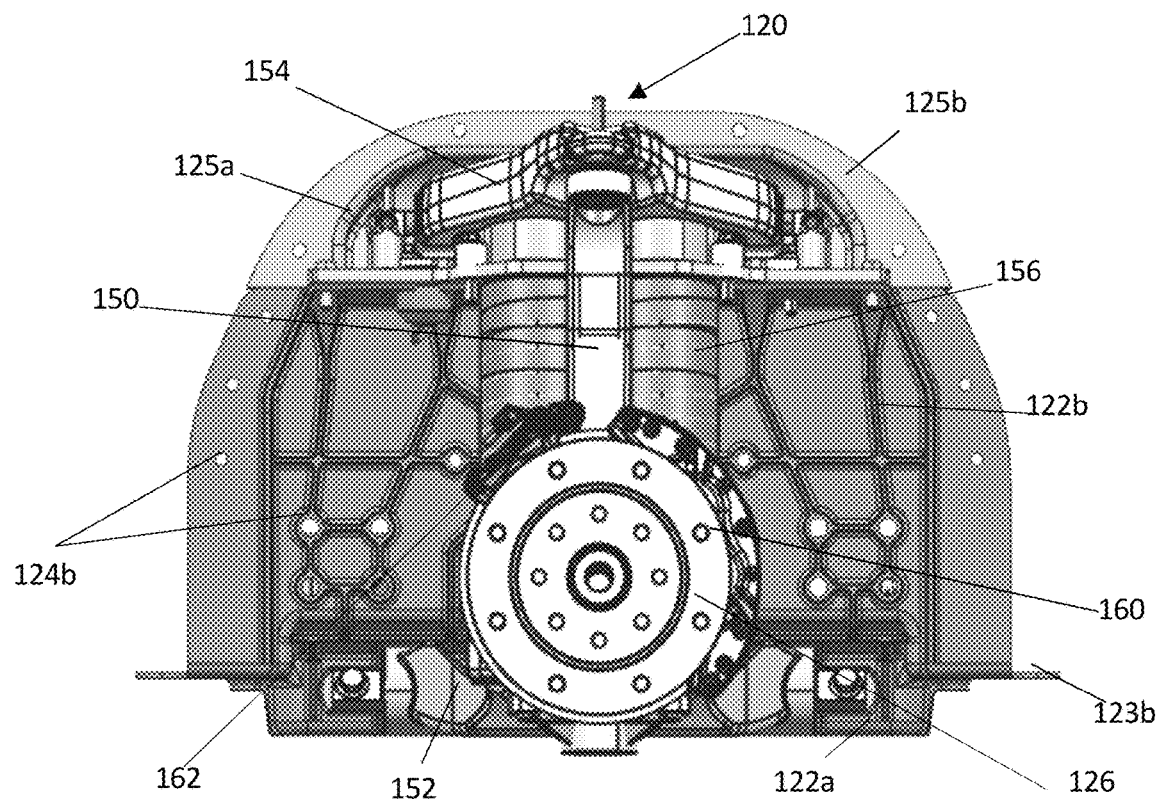
Figure 9D:
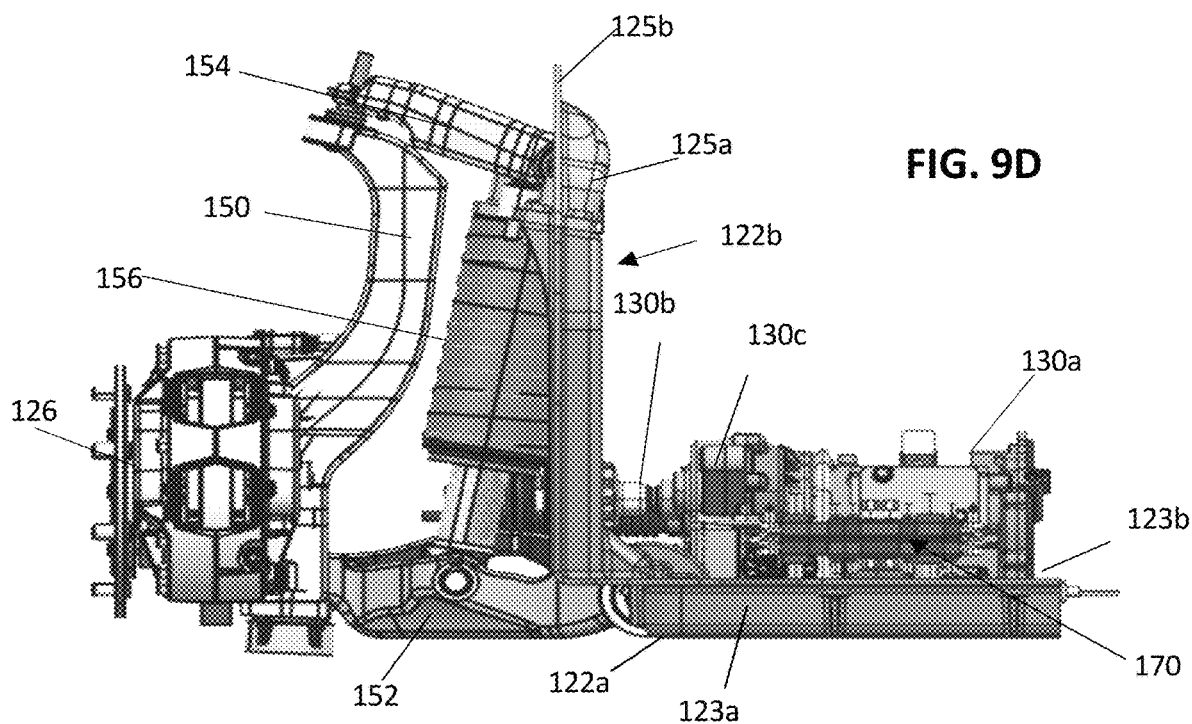
Figures 9E, 9F:
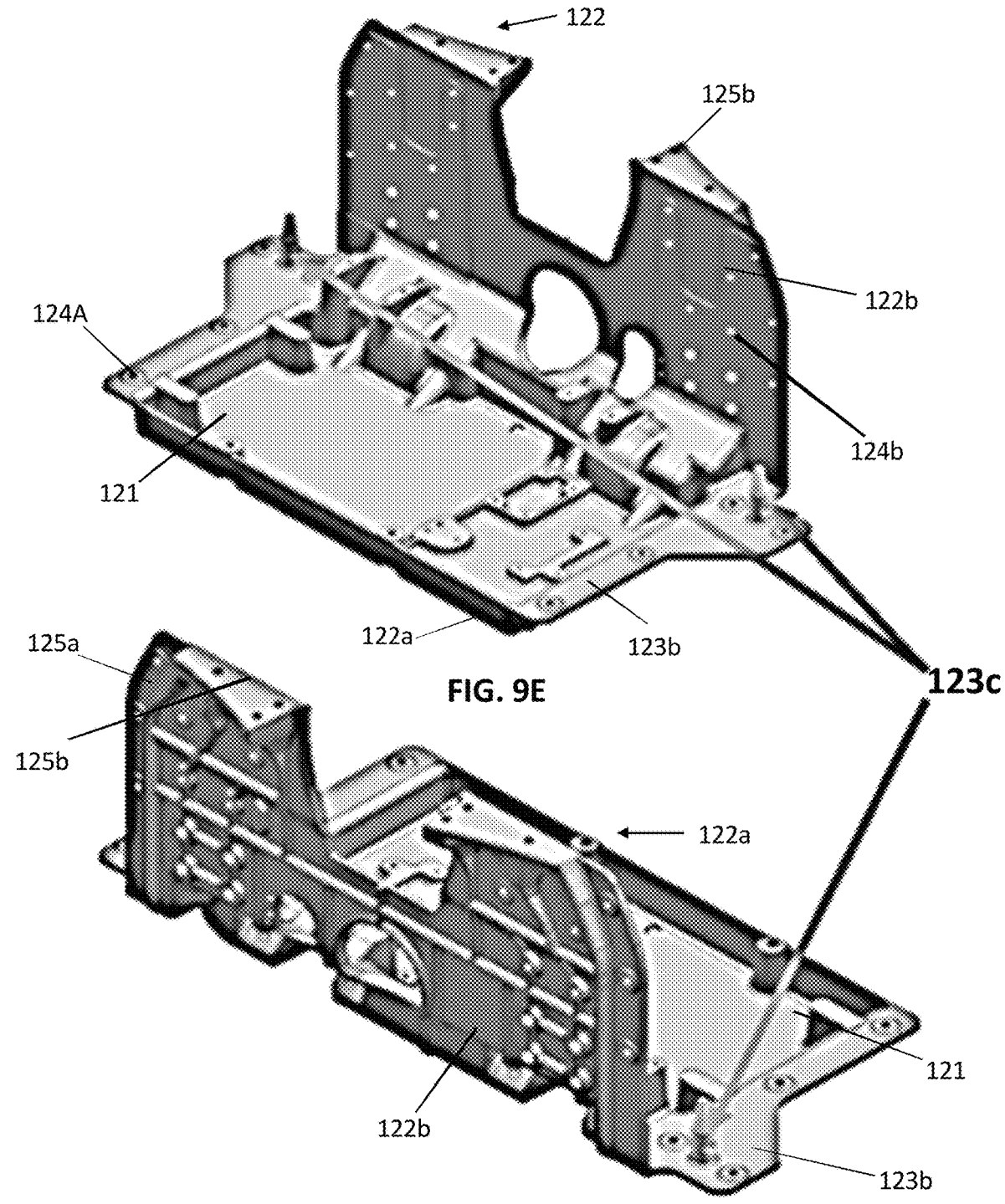
FIGS. 9E and 9F are front and back view perspective illustrations of a sub-frame, suitable for use in the VCM of FIGS. 9A to 9D, according to some embodiments of the disclosed technology.

As seen, in the embodiment of FIGS. 9A to 9F, base 122a is not planar, but rather includes a base surface surrounded by substantially vertical wall portions 123a, each of the wall portions terminating in a substantially horizontal flange 123b. The base surface, together with vertical wall portions 123a, form a recess 121 in which are disposed vehicle subsystems, as explained herein. As seen clearly in FIGS. 9C and 9D, lateral wall extends from flange 123b. As seen in FIG. 9B, bores 124a are formed in flange 123b of base 122a, and are adapted for connection to a reference frame of a vehicle, for example by suitable fasteners, as explained hereinbelow.

As seen in FIGS. 9E and 9F, in some embodiments, horizontal flange 123b may have a plurality of alignment pins 123c formed thereon. Alignment pins 123c are adapted to assist in aligning base 122a of sub-frame 120 with the reference-frame of the vehicle (as described hereinbelow with respect to FIGS. 10A to 10D), prior to connection of the subframe to the reference frame using bolts or screws, to ease the attachment process and its accuracy.

Similarly, in the embodiment of FIGS. 9A to 9D, lateral wall 122b is not planar, but rather includes a main surface, surrounded by lip 125a, the lip terminating in a flange 125b. The main surface of lateral wall 122b is disposed closer to the recess of base 122a than flange 125b, such that flange 125b is disposed closer to the front of the VCM. Bores 124b are formed in the main surface and in the flange 125b of lateral wall 122b, and are adapted for connection to a reference frame of a vehicle, for example by suitable fasteners, as explained hereinbelow.

VCM 120 further includes a wheel-hub assembly 126, adapted to have a wheel mounted thereon. Wheel-hub assembly 126 is mounted on lateral wall 122b of sub-frame 122, via a knuckle 150. Knuckle 150 connects wheel hub assembly 126 to an upper suspension arm 154 and to a lower suspension arm 152, both forming part of the suspension subsystem 134 of VCM 120. Suspension subsystem 134 further includes a shock absorber 156, disposed between the upper and lower suspension arms.

In some embodiments, for example as shown in FIG. 9C, shock absorber 156 of suspension subsystem 134 may be a dual shock absorber, having two absorbing elements. A dual shock absorber may be used to reduce a vertical size/space occupied by the absorbers per load capacity. A dual shock absorber may allow there to be a space between the absorber units, for connection of a driveshaft between wheel-hub assembly 126 and the drivetrain unit connected to sub-frame 122.

Wheel-hub assembly 126 and suspension subsystem 134 are mounted onto a side of lateral wall 122b which is distal to base 122a, and as such are separated from subsystems mounted onto the base by lateral wall 122b.

Base 122a of sub-frame 122 has mounted thereon a drive motor 130a, which is functionally associated with a driveshaft 130b, both forming drive subsystem units of the drive subsystem of the VCM. The drive subsystem further includes drivetrain 130c, which is also mounted onto base 122a. As seen clearly in FIG. 9B, driveshaft 130b passes via lateral wall 122b.

Base 122a further has mounted thereon a steering actuator 132 forming a steering subsystem unit of the steering subsystem of the VCM. As seen clearly in FIG. 9B, the steering actuator 132 does not engage lateral wall 122b.

A brake power unit 136, forming a braking subsystem unit of the braking subsystem of the VCM, is also mounted onto base 122a. Brake power unit 136 may include a brake pump and/or a brake power source and is functionally associated with a brake disc 160 and a brake caliper 162, both of which are functionally associated with wheel-hub assembly 126. As seen in FIGS. 9A and 9B, brake disc 160 and brake caliper 162 are disposed on one side of wall 122b, while brake power unit 136 is disposed on the opposing side of the lateral wall. As such, in the illustrated embodiment, braking subsystem units of the braking subsystem are separated by lateral wall 122b. Alternatively, a brake fluid reservoir may be located at the side of wall 122b facing wheel-hub assembly 126, thereby facilitating easier access for checking and/or filling brake fluid without disassembling VCM 120.

Base 122a further has mounted thereon an electronic hub 166, which includes the VCM-controller, as well as other electronic components of the VCM, such as communication components, data buses, and the like.

As seen clearly in FIGS. 9B and 9D, in some embodiments, a VCM portion 170 of a multi-interface connection-element, substantially as described hereinabove with respect to FIGS. 4 to 7, is mounted onto base 122a of sub-frame 122. As seen, the VCM-portion 170 may be disposed at a portion of base 122a which is distal to wheel-hub assembly 126, and may be accessible, without removing the VCM 120 from a sub-frame of the vehicle, substantially as described hereinabove.

Reference is now additionally made to FIGS. 10A, 10B, 10C, and 10D, which are perspective view illustrations of steps of connecting L-shaped VCM 120 to a vehicle reference frame 112, and fasteners required for such connection, according to some embodiments of the disclosed technology.

As seen in FIGS. 10A to 10D, and as described hereinabove with respect to FIGS. 8A to 8D, in an initial installation step, VCM 120 is disposed laterally away from reference frame 112, and is lower than the reference frame along the Z axis.

Figure 10A:
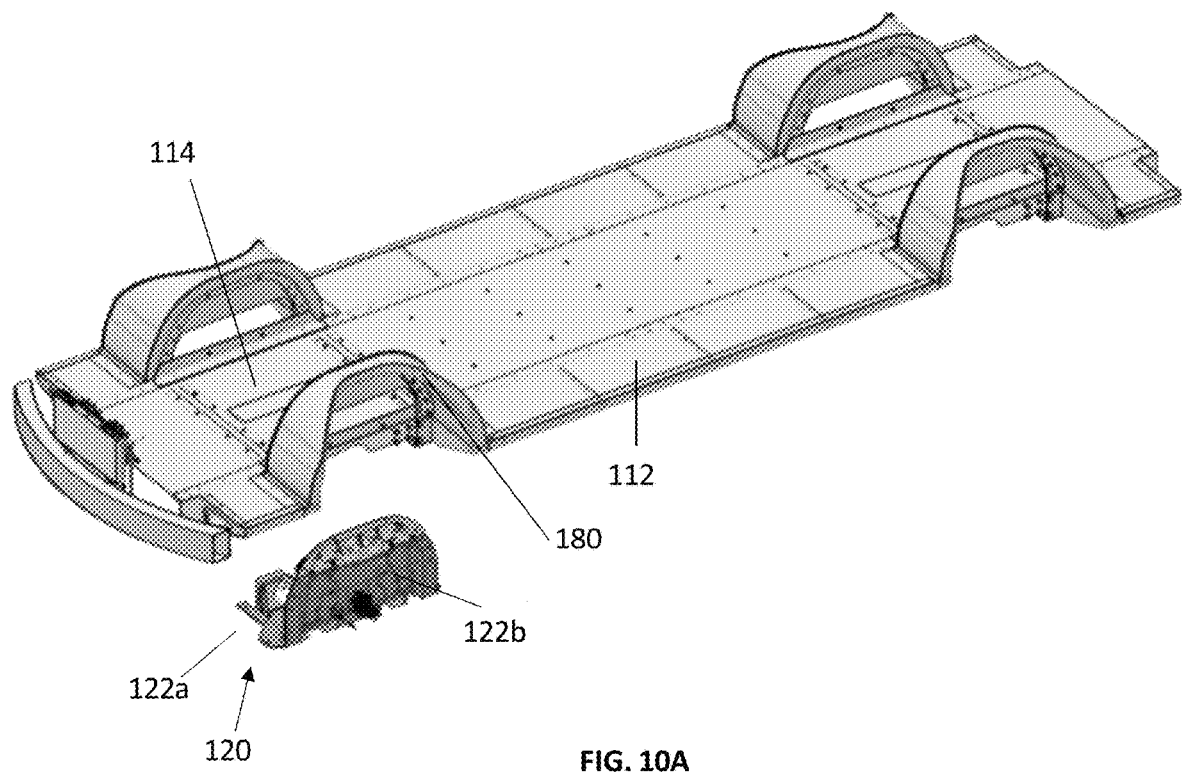
FIGS. 10A, 10B, 10C, and 10D are perspective view illustrations of steps of connecting a VCM, similar to that of FIGS. 9A to 9D, to a vehicle reference frame, and fasteners required for such connection, according to some embodiments of the disclosed technology.
Figure 10B:
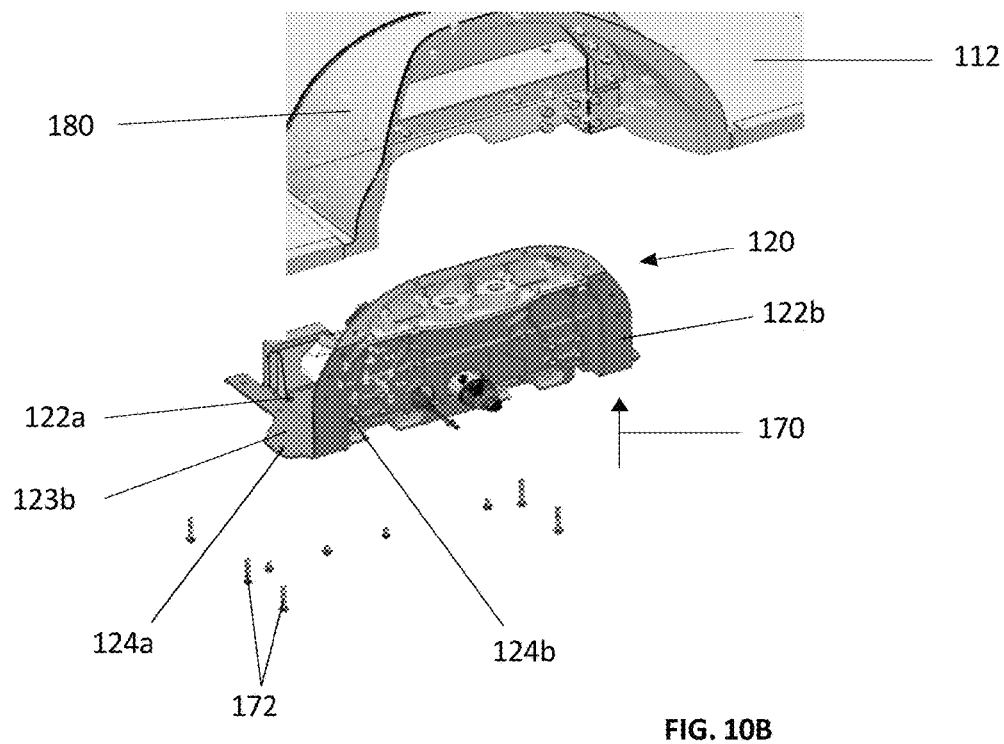
Figure 10C:
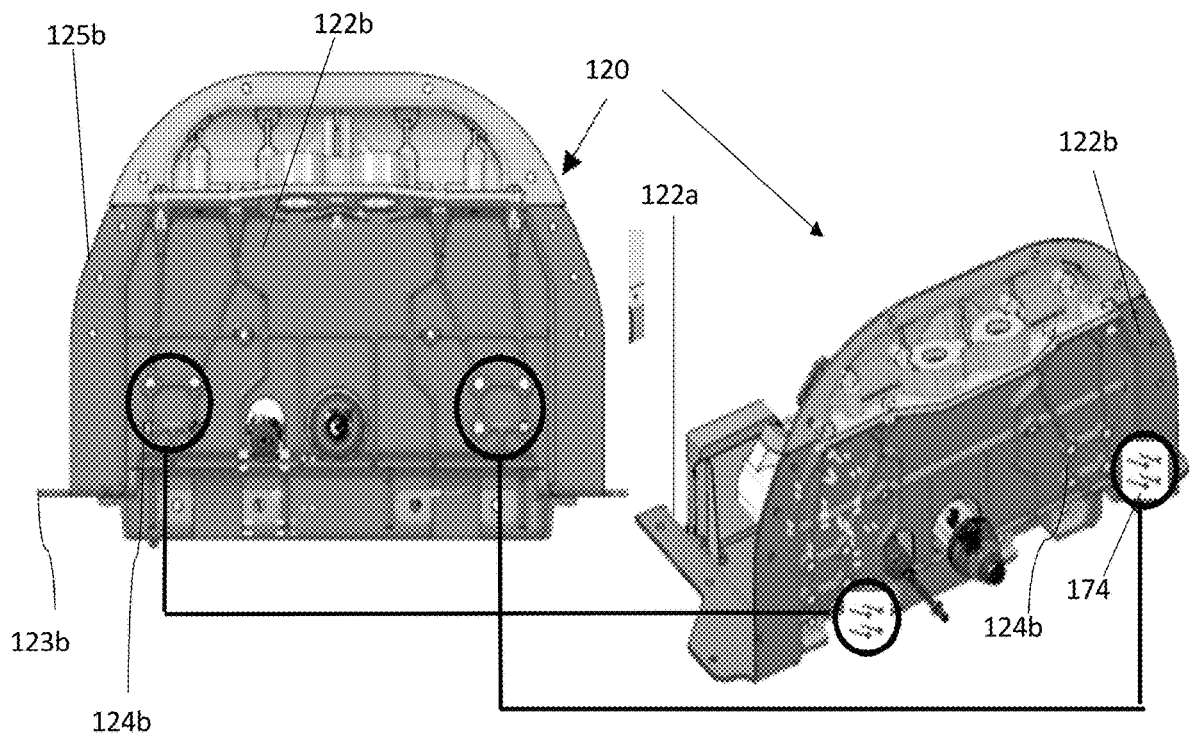
Figure 10D:
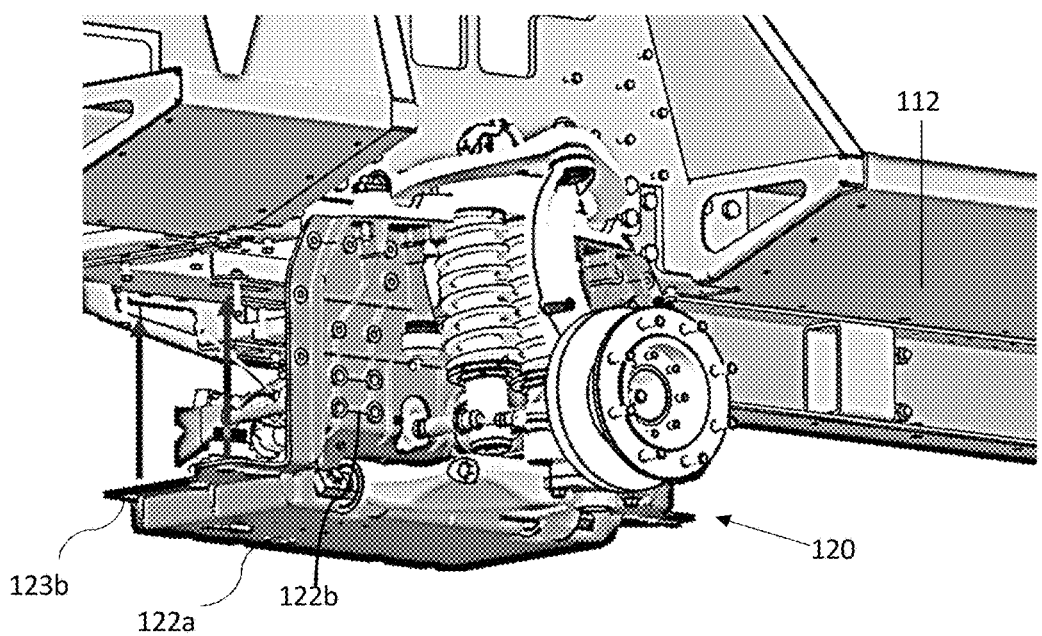

As seen clearly in FIG. 10B, when the VCM 120 is laterally aligned with reference frame 112, the VCM is moved upward to its mounting location, in a direction indicated by arrow 170. In embodiments which include aligning pins 123c, the pins are typically aligned with suitable bores in reference frame 112, and are inserted thereinto. Sub-frame 120 is fastened to reference frame 112 by a plurality of fasteners 172 which extend through the bores 124a on flange 123b. Additional fasteners 174, shown in FIG. 10C, are adapted to fasten lateral wall 122b to the reference frame 112.

In some embodiments, a fender or wheel-enclosure 180 extends above an upper surface of reference frame 112, in some embodiments in longitudinal alignment with VCM-receiving segment 114. In some embodiments, VCM 120 may further be attached to the wheel-enclosure 180, for example by additional fasteners (not explicitly shown).

Figure 11A:
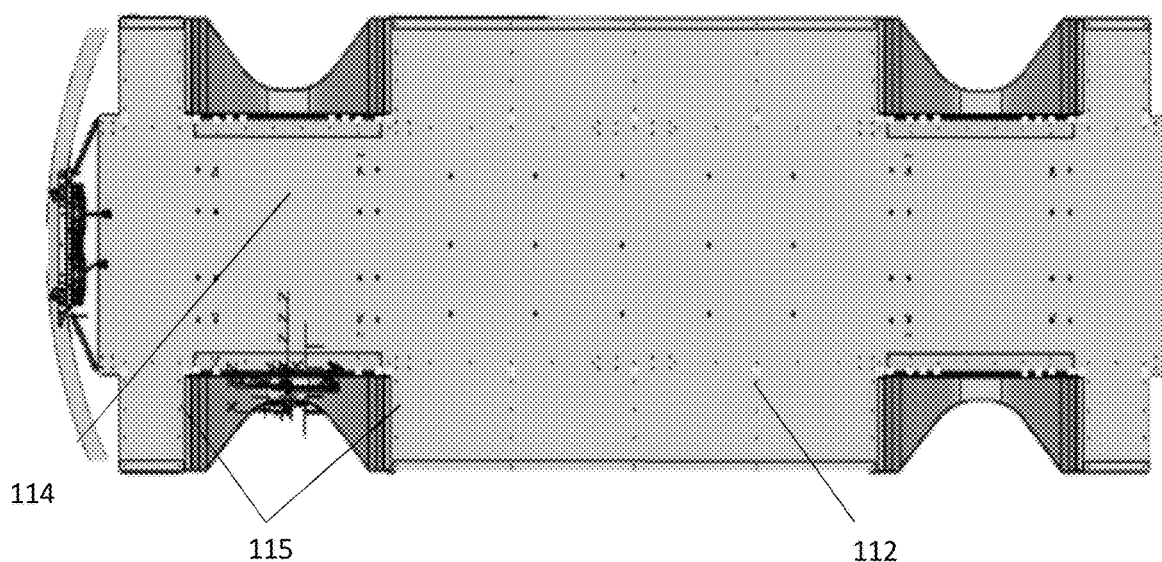
FIG. 11A is a bottom view illustration of a vehicle reference frame ready for installation of a VCM thereon.
Figure 11B:
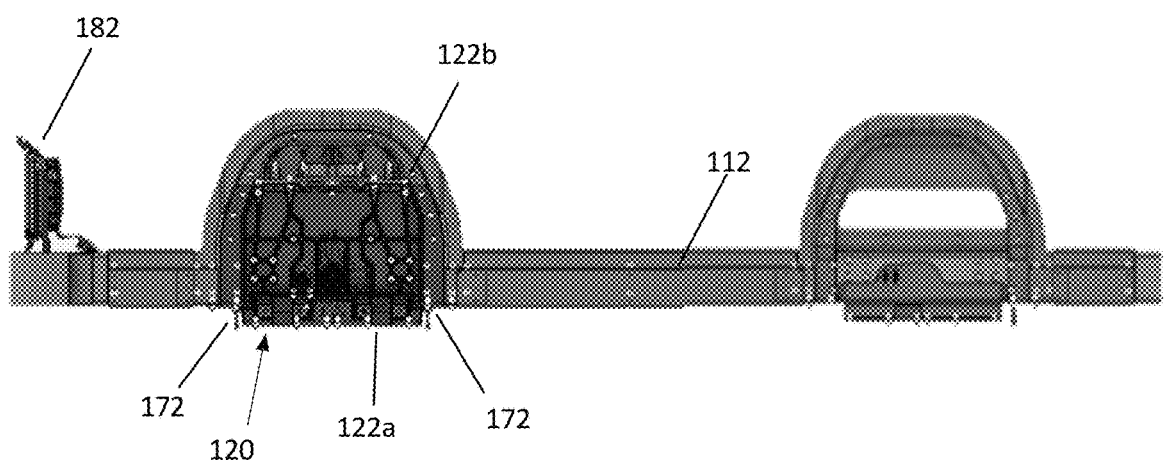
FIG. 11B is a side view illustration of the vehicle reference frame of FIG. 11A, having a VCM connected thereto using the multi-interface connection-element of FIG. 2, according to some embodiments of the disclosed technology.

Reference is now additionally made to FIG. 11A, which is a bottom view illustration of a vehicle reference frame 112 ready for installation of L-shaped VCM 120 thereon, and to FIG. 11B, which is a side view illustration of vehicle reference frame 112, having L-shaped VCM 120 connected thereto.

As seen in FIG. 11A, a bottom surface of reference frame 112 includes a plurality of bores 115, adapted to receive the fasteners 172, thereby to connect the sub-frame to the reference frame.

In some embodiments, such as the embodiment shown in FIG. 11B, the reference frame 112 has mounted thereon a vehicle portion 182 of a multi-interface connection-element as described hereinabove with respect to FIGS. 4 to 7. The vehicle portion 182 is adapted to be connected to a VCM portion of the multi-interface connection-element (not explicitly shown), substantially as described hereinabove.

Additionally, as seen in FIG. 11B, when the VCM 120 is installed in reference frame 112, the base 122a extends below the bottom surface of the reference frame. However, the entire sub-frame 122 is within the footprint of the reference frame 112.

Figure 12:
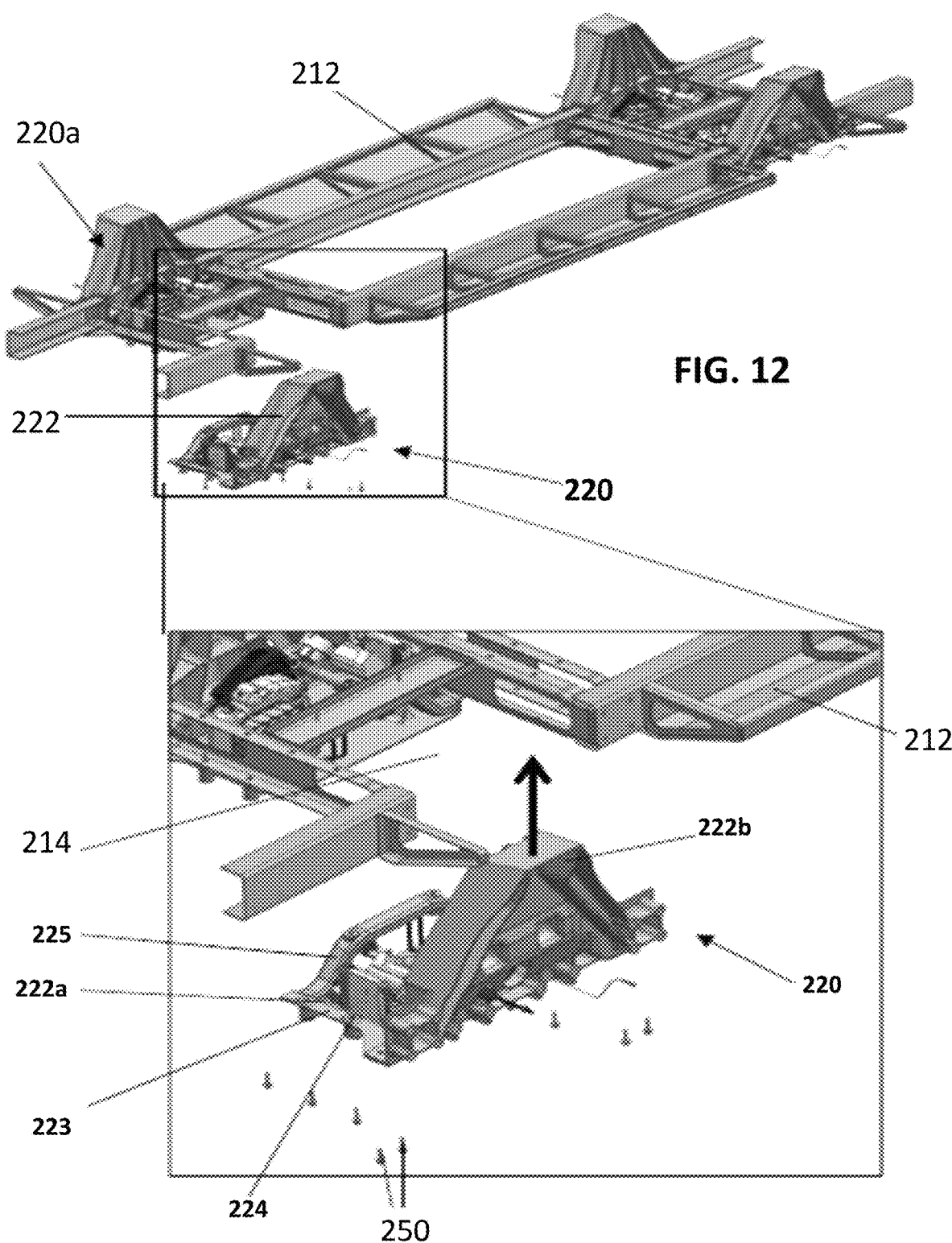
FIG. 12 is a perspective view illustration of a sub-frame of a VCM and a reference frame of a vehicle platform, detached from one another, according to some embodiments of the disclosed technology.
Figure 13A:
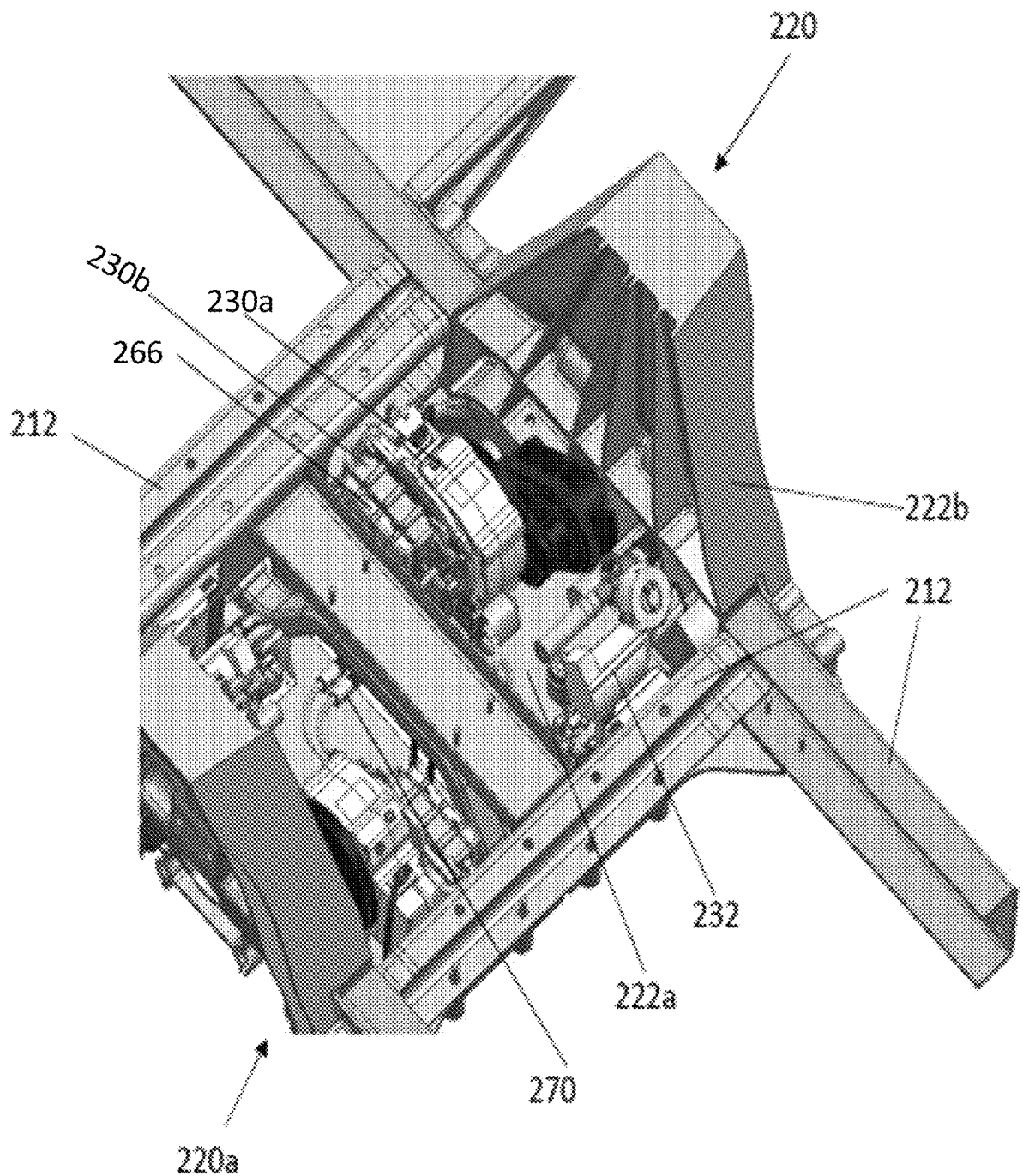
FIGS. 13A, 13B, and 13C are, respectively, a perspective view illustration, atop view planar illustration, and a front view planar illustration of the sub-frame and reference-frame of FIG. 12, when connected to each other.
Figure 13B:
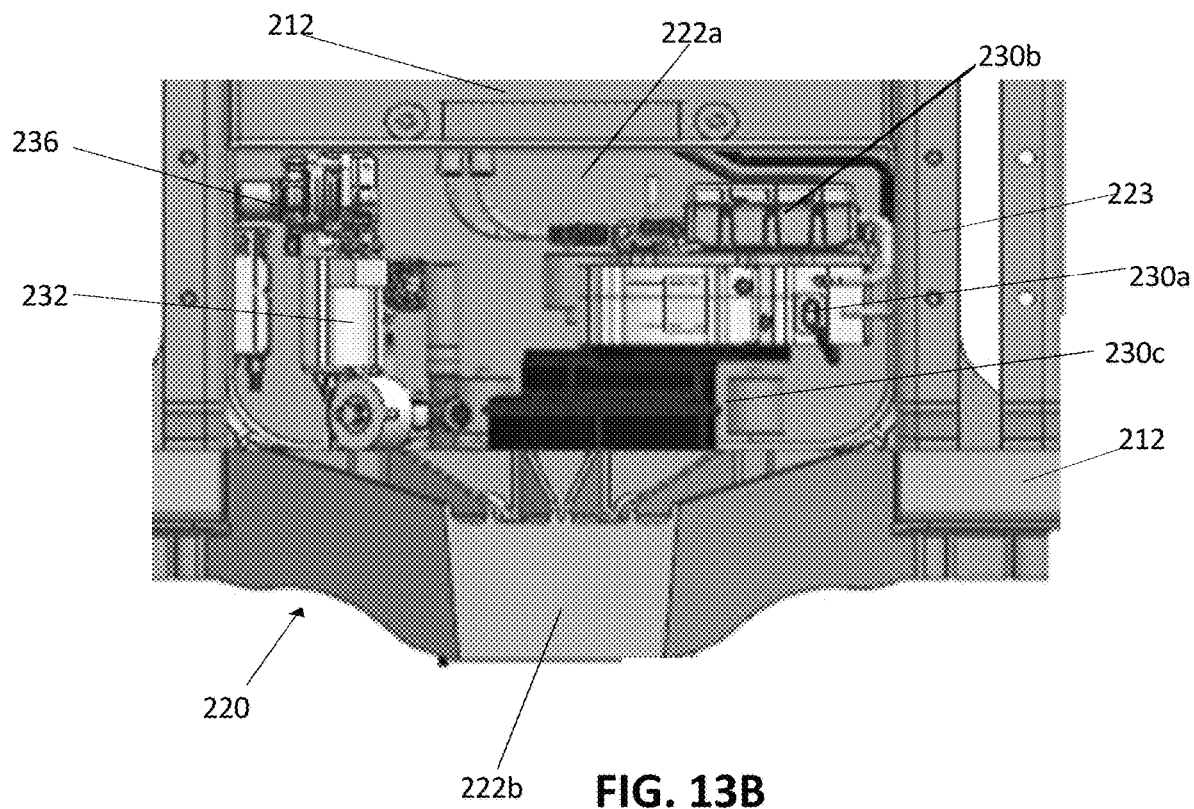
Figure 13C:
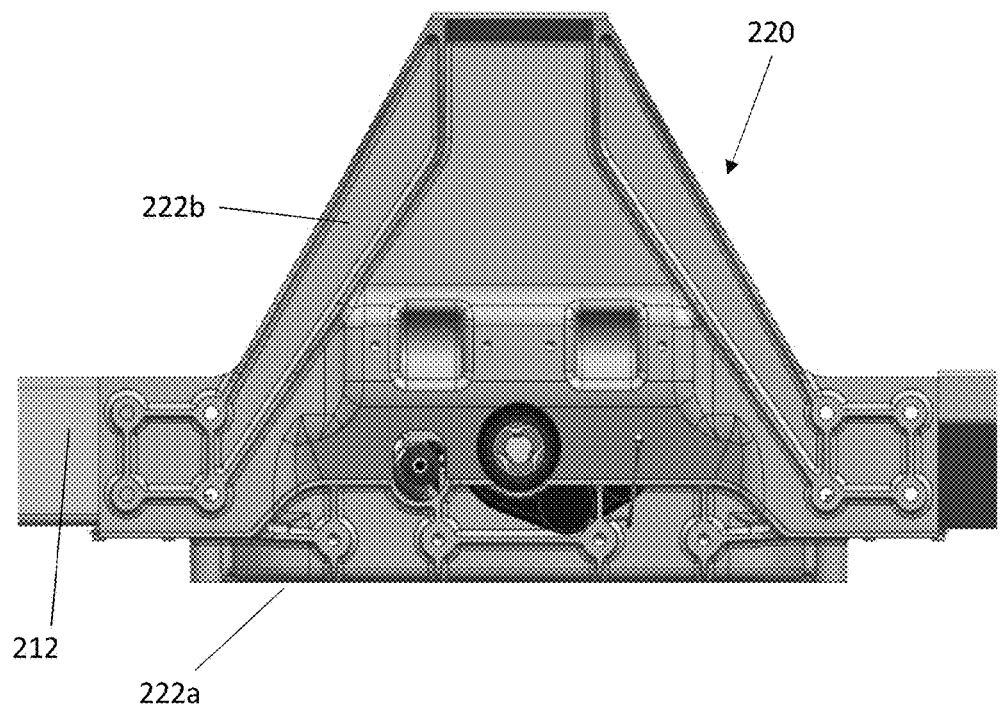

Reference is now made to FIG. 12, which is a perspective view illustration of a sub-frame 222 of an L-shaped VCM 220 and a reference frame 212 of a vehicle platform, detached from one another, according to some embodiments of the disclosed technology. Reference is additionally made to FIGS. 13A, 13B, and 13C, which are, respectively, a perspective view illustration, a top view planar illustration, and a front view planar illustration of sub-frame 222 and reference-frame 212, when connected to each other.

As seen in the enlarged portion of FIG. 12, VCM 220 is longitudinally and laterally aligned with a VCM-receiving segment 214 of reference frame 212, which cavity is sized and configured to receive the VCM. The VCM 220 is disposed beneath the VCM receiving segment 214.

VCM 220 includes an L-shaped sub-frame 222, including a base 222a and a lateral wall 222b, substantially perpendicular to base 222a. Base 222a includes substantially horizontal flanges 223 on two sides thereof, and an arch 225 at an end of the base distal to lateral wall 222b. Bores 224 are formed in flange 223, and are adapted for connection to reference frame 212, for example by fasteners 250. In the illustrated embodiment, the lateral wall 222b is not fastened to reference frame 212.

As seen in FIGS. 13A to 13C, VCM 220 further includes a sub-frame 222. A second VCM 220a is mounted onto a second VCM-receiving segment, and is disposed across from VCM 220.

Base 222a of sub-frame 222 has mounted thereon a drive motor 230a, including an inverter 230b and a transmission 230c, all of which form drive subsystem units of a drive subsystem, a steering actuator 232 which forms a steering subsystem unit of a steering subsystem, and a brake actuator 236 which forms a braking subsystem unit of a braking subsystem. Subsystem units of the drive, steering, and braking subsystems are disposed on one side of lateral wall 222b, with a wheel of the VCM adapted to be disposed on the opposing side of the lateral wall. As such, the subsystem units of the drive, steering, and braking subsystems mounted onto base 222a are separated from the wheel (when one is mounted on the VCM) by lateral wall 222b. Base 222a further has mounted thereon an electronic hub 266, which includes the VCM-controller, as well as other electronic components of the VCM, such as communication components, data buses, and the like. Electrical and/or coolant connectors 270 connect systems on sub-frame 222 to systems disposed on reference frame 212.

CONCLUDING COMMENT

All references cited herein are incorporated by reference in their entirety. Citation of a reference does not constitute an admission that the reference is prior art.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A vehicle corner module (VCM) connectable to a VCM-connection interface of a reference-frame of a vehicle platform, for regulating motion of a vehicle, the VCM comprising:
   a sub-frame including:
      a base;
      a wall disposed transversely to the base; and
      a vehicle-connection interface for reversible mechanical connection of the VCM to the VCM-connection interface of the reference frame;
   a wheel-hub assembly comprising a wheel-hub adapted for mounting of a wheel thereon; and
   at least one subsystem of the vehicle, comprising a subsystem unit mounted onto the base of the sub-frame, the at least one subsystem being selected from the group of subsystems consisting of a drive subsystem, a steering subsystem, and a braking subsystem,
   wherein the wall of the sub-frame is disposed between the base of the sub-frame and the wheel-hub assembly.

2. A method of installing the VCM of claim 1 on the reference-frame of a vehicle, the method comprising:
   longitudinally aligning the sub-frame with the VCM-connection interface, when the sub-frame is disposed below the reference-frame; and
   moving the VCM upward to facilitate the engagement of the vehicle-connection interface with the VCM-connection interface.

3. A method for installing a VCM on a vehicle platform of a vehicle, the method comprising:
   (a) obtaining a vehicle corner module (VCM) connectable to a VCM-connection interface of a reference-frame of a vehicle platform, for regulating motion of a vehicle, the VCM comprising:
      a sub-frame including:
         a base;
         a wall disposed transversely to the base; and
         a vehicle-connection interface for reversible mechanical connection of the VCM to the VCM-connection interface of the reference frame;
      a wheel-hub assembly comprising a wheel-hub adapted for mounting of a wheel thereon; and
      at least one subsystem of the vehicle, comprising a subsystem unit mounted onto the base of the sub-frame, the at least one subsystem being selected from the group of subsystems consisting of a drive subsystem, a steering subsystem, and a braking subsystem,
      wherein the wall of the sub-frame is disposed between the base of the sub-frame and the wheel-hub assembly;
   (b) longitudinally aligning the base of the sub-frame of the VCM with the VCM-connection interface, such that a lateral distance exists between the base and the reference frame, and the base is disposed below the reference frame along the Z-axis;

(c) without changing the longitudinal alignment of the base of the sub-frame with the VCM-connection interface, moving the VCM laterally toward the reference frame until the lateral distance between the sub-frame and the reference frame is closed;

(d) without changing the longitudinal alignment or a lateral alignment of the base of the sub-frame, moving the VCM upwardly toward the reference-frame until the base of the sub-frame engages the reference-frame; and (e) mechanically connecting the VCM to the reference frame by engaging the vehicle-connection interface of the VCM with the VCM-connection interface of the reference frame.

4. The method of claim 3, further comprising connecting the VCM to multiple electronic or flow subsystems of the vehicle by connecting a VCM-portion of a multi-interface connection-element, the VCM-portion being mounted on the sub-frame, to a vehicle-platform portion of the multi-interface connection-element, the vehicle-platform-portion forming part of the vehicle platform.

5. The method of claim 4, wherein each of the multiple electronic or flow subsystems is selected from the subsystem group consisting of a power supply, a control-circuit, a computerized controller, a network bus, a network interface, a coolant flow subsystem, an oil flow subsystem, and a brake-fluid flow subsystem.

6. The method of claim 3, wherein the mechanically connecting comprises placing fasteners which engage the vehicle-connection interface and the VCM-connection interface.

7. A method for installing a VCM on a vehicle platform of a vehicle, the method comprising:

(a) obtaining a vehicle corner module (VCM) connectable to a VCM-connection interface of a reference-frame of a vehicle platform, for regulating motion of a vehicle, the VCM comprising:
  a sub-frame including:
    a base;
    a wall disposed transversely to the base; and
    a vehicle-connection interface for reversible mechanical connection of the VCM to the VCM-connection interface of the reference frame;
  a wheel-hub assembly comprising a wheel-hub adapted for mounting of a wheel thereon; and
  at least one subsystem of the vehicle, comprising a subsystem unit mounted onto the base of the sub-frame, the at least one subsystem being selected from the group of subsystems consisting of a drive subsystem, a steering subsystem, and a braking subsystem, wherein, when the wheel is mounted onto the wheel-hub assembly, the base of the sub-frame is at least partially disposed within a cylindrical footprint of the wheel;

(b) longitudinally aligning the base of the sub-frame of the VCM with the VCM-connection interface, such that a lateral distance exists between the base and the reference frame, and the base is disposed below the reference frame along the Z-axis;

(c) without changing the longitudinal alignment of the base of the sub-frame with the VCM-connection interface, moving the VCM laterally toward the reference frame until the lateral distance between the sub-frame and the reference frame is closed;

(d) without changing the longitudinal alignment or a lateral alignment of the base of the sub-frame, moving the VCM upwardly toward the reference-frame until the base of the sub-frame engages the reference-frame; and (e) mechanically connecting the VCM to the reference frame by engaging the vehicle-connection interface of the VCM with the VCM-connection interface of the reference frame.

8. The method of claim 7, further comprising connecting the VCM to multiple electronic or flow subsystems of the vehicle by connecting a VCM-portion of a multi-interface connection-element, the VCM-portion being mounted on the sub-frame, to a vehicle-platform portion of the multi-interface connection-element, the vehicle-platform-portion forming part of the vehicle platform.

9. The method of claim 8, wherein each of the multiple electronic or flow subsystems is selected from the subsystem group consisting of a power supply, a control-circuit, a computerized controller, a network bus, a network interface, a coolant flow subsystem, an oil flow subsystem, and a brake-fluid flow subsystem.

10. The method of claim 7, wherein the mechanically connecting comprises placing fasteners which engage the vehicle-connection interface and the VCM-connection interface.

* * * * *